(12) United States Patent  (10) Patent No.: US 9,002,858 B1
Dassa et al.  (45) Date of Patent: Apr. 7, 2015

(54) METHODS, SYSTEMS, AND MEDIA FOR GENERATING AND PRIORITIZING RELEVANT CONTENT IN REAL-TIME DATA SYSTEMS

(75) Inventors: Guy Dassa, New Rochelle, NY (US); Joseph P. Doran, Darien, CT (US)

(73) Assignee: Rallyverse, Inc., New York, NY (US)

( * ) Notice: Subject to any disclaimer, the term of this patent is extended or adjusted under 35 U.S.C. 154(b) by 141 days.

(21) Appl. No.: 13/567,005

(22) Filed: Aug. 3, 2012

Related U.S. Application Data

(60) Provisional application No. 61/514,835, filed on Aug. 3, 2011, provisional application No. 61/514,847, filed on Aug. 3, 2011.

(51) Int. Cl.
*G06F 17/30* (2006.01)
*G06Q 30/02* (2012.01)
*G06Q 50/00* (2012.01)

(52) U.S. Cl.
CPC .......... *G06Q 50/01* (2013.01); *G06F 17/30699* (2013.01); *G06Q 30/0202* (2013.01); *G06F 17/3089* (2013.01)

(58) Field of Classification Search
USPC .................. 707/750; 705/7.28, 7.31, 319
See application file for complete search history.

(56) References Cited

U.S. PATENT DOCUMENTS

| | | | |
|---|---|---|---|
| 8,856,232 B1 * | 10/2014 | Swerdlow et al. | 709/204 |
| 2005/0222901 A1 * | 10/2005 | Agarwal et al. | 705/14 |
| 2009/0006311 A1 * | 1/2009 | Ting et al. | 707/2 |
| 2012/0226678 A1 * | 9/2012 | Park et al. | 707/709 |
| 2012/0254152 A1 * | 10/2012 | Park et al. | 707/710 |

OTHER PUBLICATIONS

Costa, How to Write an Amazing Article, Mar. 17, 2010.*
Frommer, Here's How BuzzFeed Works—Business Insider, Jun. 11, 2010.*
Hines, 4 Useful Twitter Automation Tools and How to Use Them, Mar. 30, 2011.*
Huang, Conversational Tagging in Twitter, Jun. 2010.*
Lim et al., Utilizing Wikipedia as a Knowledge Source in Categorizing Topic related Koren Blogs into Facets, Mar. 2011.*
Smarty, How to Create a Useful Twitter Retweet Bot, Nov. 15, 2009.*
Stack Exchange, How can I get posts in a subcategory to display on its parent categories archive page, 2010.*
Stack Overflow, What is the best way to compute trending topics or tags, 2009.*

(Continued)

*Primary Examiner* — William Spieler
(74) *Attorney, Agent, or Firm* — Byrne Poh LLP

(57) ABSTRACT

In accordance with various embodiments of the disclosed subject matter, methods, systems, and media for generating and prioritizing relevant content in real-time data systems are provided. In some embodiments, a method for recommending content for publishing is provided, the method comprising: receiving content from one or more content sources; determining one or more term entities associated with the content; calculating a score of the one or more terms based on a frequency, a recency, and a density at which the one or more term entities appear in one or more real-time information sources; and recommending a content item for publication to at least one of the one or more real-time information sources based on the score, wherein the content item comprises at least a portion of the received content.

24 Claims, 15 Drawing Sheets

(56) References Cited

OTHER PUBLICATIONS

Vryniotis, Twitter & Facebook links affect SEO on Google and Bing, Web SEO Analytics, Dec. 7, 2010.*

WordPress Forums, Tweet only a certain category from wordpress entries, 2010.*

Schwartz, Google's New Search-Based Keyword Tool Tells You What Keywords You're Missing, Nov. 18, 2008.*

* cited by examiner

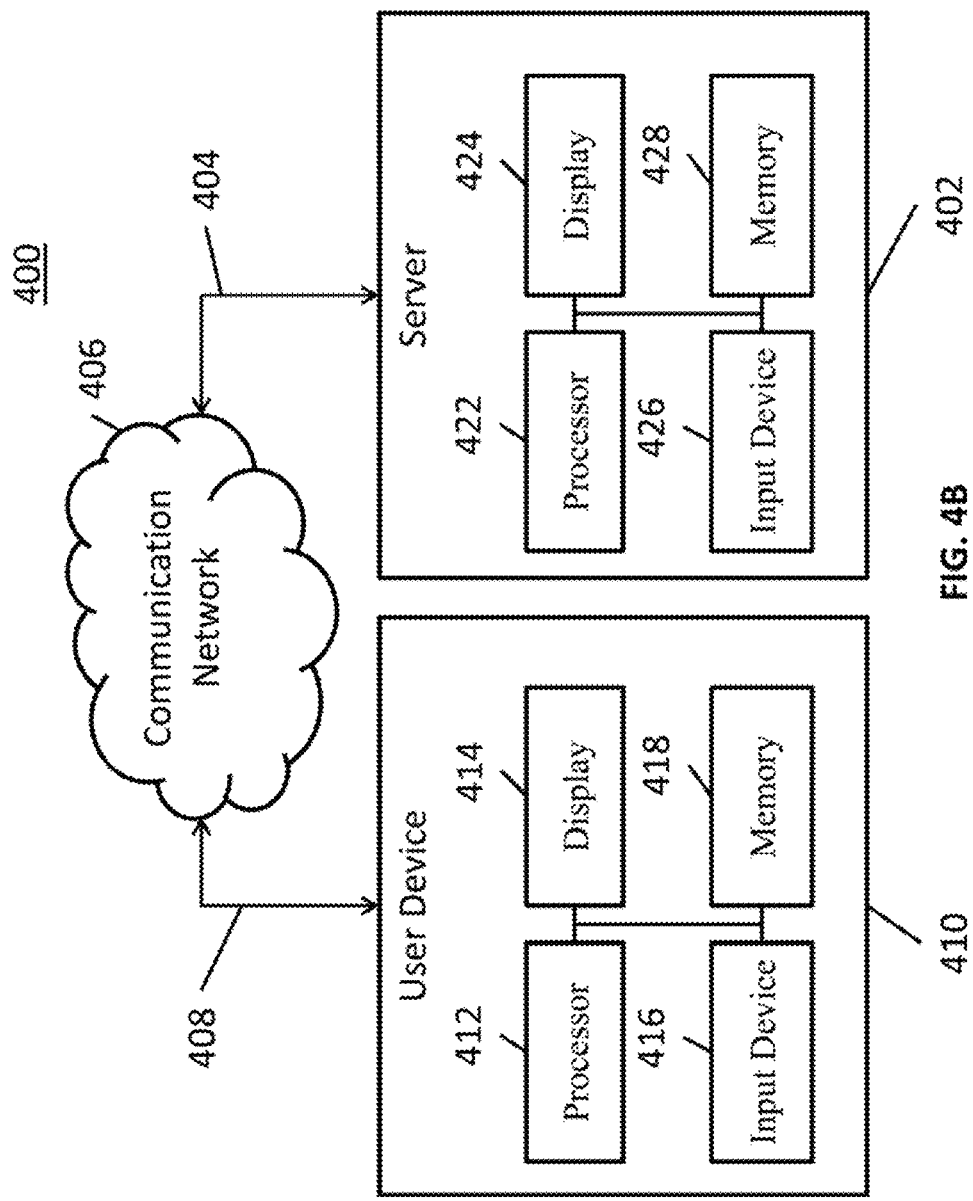

METHODS, SYSTEMS, AND MEDIA FOR GENERATING AND PRIORITIZING RELEVANT CONTENT IN REAL-TIME DATA SYSTEMS

CROSS-REFERENCE TO RELATED APPLICATION

This application claims the benefit of U.S. Provisional Patent Application No. 61/514,847, filed Aug. 3, 2011, and U.S. Provisional Patent Application No. 61/514,835, filed Aug. 3, 2011, which are hereby incorporated by reference herein in their entireties.

This application is related to U.S. patent application Ser. No. 13/162,527, filed Jun. 16, 2011, which is hereby incorporated by reference herein in its entirety.

TECHNICAL FIELD

The disclosed subject matter relates to methods, systems, and media for generating and prioritizing relevant content in real-time data systems. More particularly, methods, systems, and media for generating content items from received content and prioritizing relevant content items in real-time data streams by scoring content items based on real-time data (e.g., real-time content, real-time online trend data, influence data, and/or user interest and behavior data) and/or preferences associated with an entity.

BACKGROUND

Entities, such as consumers and digital publishers, are constantly searching for approaches to discover and promote the most relevant content at the right time. Advertisers are constantly striving to reach their followers and fans with their messaging and do that via the publishing of relevant content.

Current approaches for determining relevancy in the real-time data stream generally rely on the manual creation of search queries across a set of real-time content and filtering the results based upon proximity to the keywords in the search query. In addition, other factors that may be used to filter real-time content include the relevancy to a user, the time the content was published, the engagement of the content published, or the influence of the content publisher. These approaches result in a basic match of the real-time content to the query and provide basic capabilities but do little to provide deep differentiation among similar content. Additionally, these approaches lack an ability to differentiate content based upon real-time popularity or the relative change in popularity. These approaches further lack and lag in understanding the dynamic and ever-changing language used in the real-time web, and have an incomplete vocabulary or data set to understand the nature of the meaning of the keywords in their queries. Limiting the real-time data to a finite set of characters has a causal effect on the language and words used by consumers, leaving traditional natural-language processing or keyword-search methodologies limited in efficacy.

To further complicate the current problem, real-time data is growing exponentially in terms of data and content produced. The growth in quantity and diversity of such data is making discoverability a more acute problem for consumers, not to mention creating a difficult challenge in determining the relevance of individual pieces of content.

SUMMARY

In accordance with various embodiments of the disclosed subject matter, methods, systems, and media for generating and prioritizing relevant content in real-time data systems are provided.

In some embodiments, a method for recommending content for publishing is provided, the method comprising: receiving, using a hardware processor, content from one or more content sources; determining, using the hardware processor, one or more term entities associated with the content; calculating, using the hardware processor, a score of the one or more term entities based on a frequency, a recency, and a density at which the one or more terms appear in one or more real-time information sources; and recommending, using the hardware processor, a content item for publication to at least one of the one or more real-time information sources based on the score, wherein the content item comprises at least a portion of the received content.

In some embodiments, a system for recommending content for publishing is provided, the system comprising a processor that is configured to: receive content from one or more content sources; determine one or more term entities associated with the content; calculate a score of the one or more terms based on a frequency, a recency, and a density at which the one or more terms appear in one or more real-time information sources; and recommend a content item for publication to at least one of the one or more real-time information sources based on the score, wherein the content item comprises at least a portion of the received content.

In some embodiments, a non-transitory computer-readable medium containing computer-executable instructions that, when executed by a processor, cause the processor to perform a method for recommending content for publishing is provided. The method comprising: receiving content from one or more content sources; determining one or more term entities associated with the content; calculating a score of the one or more terms based on a frequency, a recency, and a density at which the one or more terms appear in one or more real-time information sources; and recommending a content item for publication to at least one of the one or more real-time information sources based on the score, wherein the content item comprises at least a portion of the received content.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 4B is a diagram of an illustrative computing device and server as provided, for example, in FIG. 4A in accordance with some embodiments of the disclosed subject matter;

DETAILED DESCRIPTION

Figure 1:
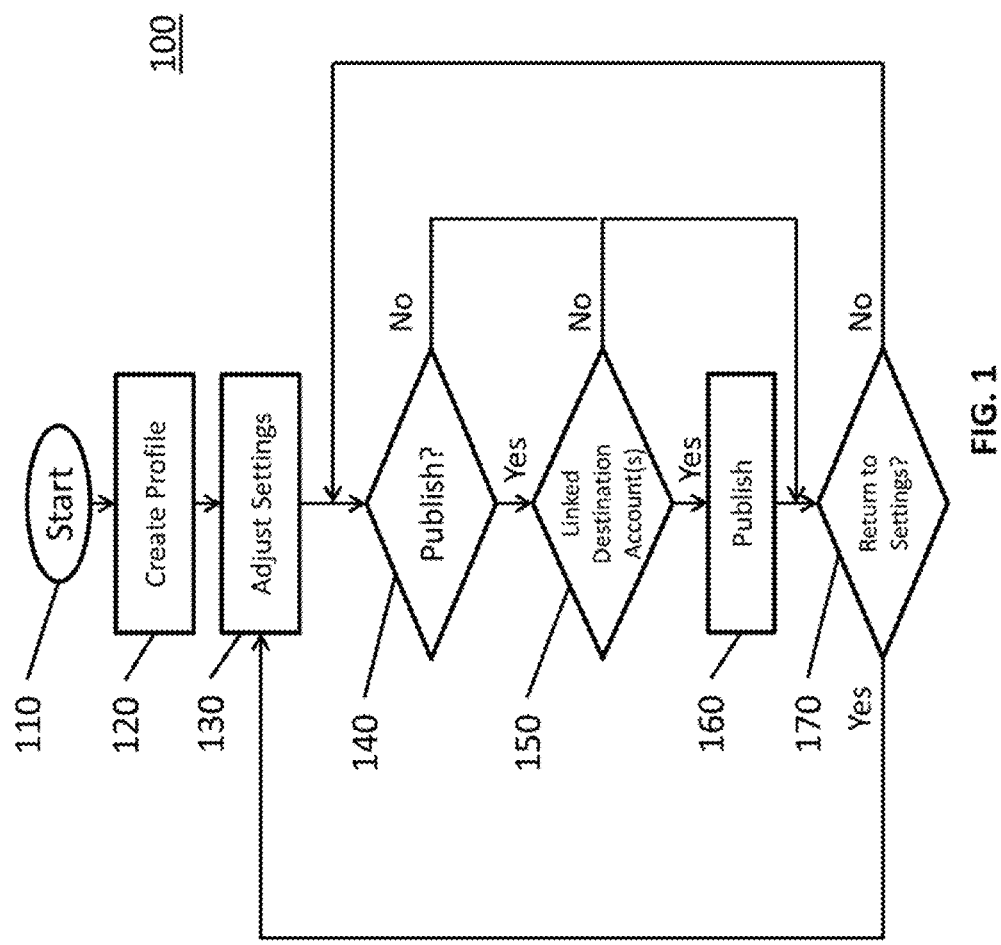
FIG. 1 is a flow chart of an illustrative process for publishing content items in accordance with some embodiments of the disclosed subject matter.

In accordance with various embodiments, mechanisms for generating and prioritizing relevant content in real-time data systems are provided. Using these mechanisms, a user may be provided with content that was automatically generated based on the user's preferences and that was ranked based on one or more criterion. The user may choose to publish such content to an account on one or more social media networks, blogs, microblogs, social networking services, etc. In some embodiments, a user may include a natural person, an organization, a member of an organization, a franchisee of an organization, or any combination of these.

In some embodiments, content may be automatically generated based on the user's preferences. In some embodiments, content may be automatically generated from content sources designated by the user. As used herein, it should be noted that content sources may include any suitable destination where content may be retrieved or requested. As used herein, it should be noted that content may include any suitable professionally published content (such as articles in an electronically published magazine, newspaper, or professional weblog) and/or any suitable user-generated content (such as personal weblogs, status updates on a social networking Web site (e.g., FACEBOOK, MYSPACE, YOUTUBE, etc.), messages posted on a social messaging Web site (e.g., TWITTER), pages on a personal photography Web site, etc.). In some embodiments, generating content items from video or image data may be performed based on metadata associated with the video or image data, or an analysis of the content of the image or video using image analysis techniques. It should also be noted that content may be provided in any suitable form, such as audio, video, images, text, etc., or any suitable combination thereof, as well as snippets or fragments of those content elements.

In some embodiments, content may be generated based on real-time information, where real-time information may include any content that has been published recently, including user-generated content. In some embodiments, real-time information includes information published within the last week, within the last twenty-four hours, within the last six hours, or any suitable length of time. Alternatively, the user can set a particular length of time from which real-time information can be retrieved (e.g., retrieve content for generating content items, where the content was published within the last twelve hours).

In some embodiments, content may be generated manually by a user creating content to be posted. Any content that is generated may be generated or transformed into the form of a "post" or a "tweet" depending on the platform on which the content may be published. For example, a "tweet" may be published to a TWITTER account, where a "tweet" may be a short message (e.g., a message limited to 140 characters by the service provided by TWITTER). As another example, a "post" may be published on a FACEBOOK page, where there may be fewer limitations on the form of the content. As yet another example, a "post" may be published to a LINKEDIN page, where there may be a slightly different set of requirements for text and graphical image content than on a FACEBOOK page. As a further example, a "post" may be published to a PINTEREST page, where there is a requirement that a graphical image, photo, or video be included with the content. As another further example, a "post" may be published to an INSTAGRAM page, where there is a requirement that a photograph be included with the content. As used herein, it should be noted that content that is generated to be published is referred to as a content item, or content items, which is intended to encompass any content that a user may publish using the processes, systems and media described herein.

In some embodiments, after content items are generated, the content items may be scored and/or ranked. The score may be representative of the likelihood that other users may engage with the content item, based on the historical popularity of topics in the content item and/or trends in the popularity of the topics in the content items. In some embodiments, a user may designate a specific pool of users or a specific topic for use in determining the popularity of content. In some embodiments, a user may designate certain topics and/or interests that, if determined to be similar to keywords in the content items, result in a higher score. In some embodiments, the content items may be ranked in accordance with the determined score. This may allow a user to publish content that is more in line with areas that the user may be interested in, rather than any and all topics that are currently popular. For example, the user may choose to publish the content items ranked at or near the top, which are more likely to coincide with the users designated topics and/or interests as well as the overall popularity of the topics in the content item.

In some embodiments, content items may be generated by scoring content created by others and recommending that the user re-use that content if the content has a score greater than a particular value. In some embodiments, the content information may contain an attribution to the original creator or author of the content.

In some embodiments, scored content items may be recommended to the user for publishing based on the calculated score. In some embodiments, content items may be recommended to the user based on the score and other variables, such as the date the content item was created or the date that the content upon which a content item is based was first published. Alternatively, in some embodiments, content items may be recommended based on how recently the content upon which a content item is based was first published without calculating a score.

In some embodiments, a user may create a profile with settings that determines how content items are generated and recommended. The settings may be used to determine which sources to generate content items from (e.g., particular sites, particular feeds, etc.), and where to publish content items (e.g., particular accounts on a social messaging service). In some embodiments, the user may link accounts from several different social networking services to a profile, where the number of accounts that may be linked may only be limited by the amount of accounts that the user has registered and/or has the right to publish on. Alternatively, in some embodiments, the number of accounts may be limited to a predetermined number.

In some embodiments, a profile may be linked to other profiles, whereby content items that are generated in the profile may be automatically recommended in the other profile(s). Similarly, content items generated in the other profile(s) may be automatically recommended in the user's profile. In some embodiments, users may be able to link and unlink their profile(s) to the other profiles, and the amount of other profiles that the user's account may be linked to may be limited to an arbitrary number, or may be unlimited. In some embodiments, a profile may be a subordinate profile associated with a master profile. In such an embodiment, a user of the subordinate or child profile may be inhibited from publishing content unless and until that content is also approved for publishing by a user of the master profile.

In some embodiments, an interface may be provided that allows a user to choose from multiple content items that have been generated for publication, and which accounts and services to publish the content to. In some embodiments, the interface may be provided using a website or an application downloaded and/or installed on a user device.

In some embodiments, information about the engagement of other users of the services where the content was published may be made available to users in any suitable format, such as a graph, a spreadsheet, a textual summary, or any suitable combination thereof.

In some embodiments, content items may be advertisements that may be scored in a similar way as other content items, whereby the expected engagement is estimated based on various factors. This may allow a user to anticipate what advertising may be the most effective, based on the recent popularity of topics and other relevant information.

It should be noted that these mechanisms may be used in a variety of applications. Applications can include automated ranking of real-time content based upon relevancy, filtering content based upon relevancy, and/or acting upon relevant content based upon business rules and logic (such as sharing, publishing, and promoting the content). These applications can be implemented within the real-time data networks themselves (e.g., the social networks), marketplaces (e.g., Facebook Ads), advertising systems, or applied across digital assets such as web pages, portals, search engines, etc. for the delivery of more relevant consumer experiences. For example, digital publishers and advertisers working through their content management systems are constantly searching for approach to place the most relevant content in front of the right user at the right time in order to increase traffic to their websites. Using the score (e.g., based on frequency, recency, and density components), content can be ranked at instances prior to presenting it to a browser. In another example, these mechanisms can also assist entities with determining what content they should produce, acquire, or syndicate based upon the relative popularity of the content or content topic areas.

In a more particular example, the owner of a small business may not have the resources to devote to building a presence on social media, and may not have the resources to manage social media accounts. In such an example, the owner may employ the mechanisms disclosed herein to post content that is likely to be relevant and is also likely to be germane to the owner's business.

In another more particular example, a franchisor or parent company, such as MCDONALDS, may encourage its franchisees to use the mechanisms described herein to build a social media presence in the franchisees' area at low cost. By allowing the franchisor to create an initial campaign, there would be a greater chance that the franchisee uses the mechanisms, thereby increasing the value of the brand for the franchisor and the franchisee alike. However, in such an example, the franchisor may wish to exert substantial control over the content being published by the franchisees as negative publicity about a franchisee may have a negative effect on the franchisor's brand. In such a case, franchisees may be assigned a subordinate profile associated with a master profile controlled by the franchisor. In this example, there may be restrictions placed on what the franchisee may publish using the subordinate profile without approval. For example, the presence of certain words in content created on behalf of the franchisee may prevent publication unless the content is approved by the franchisor via the master profile. Alternatively, all content that is not pre-approved by the franchisor may be flagged for review before publication is allowed.

Turning to FIG. 1, a process 100 for publishing content in accordance with some embodiments is illustrated. As shown, after the process starts at 110, a profile may be created for a user at 120. In some embodiments, a profile may be created by the user of the profile. Alternatively, in other embodiments, the profile may be created at 120 by an administrative user that has the ability to set and adjust profile settings for other users (e.g., an administrative user at a master profile that creates child profiles for other users). The administrative user may disable some features of the profile such that the user cannot use the disabled features. Such disabled features may be greyed out or otherwise disabled in any suitable way, including by deleting the features from an interface shown to the user. In some embodiments, the profile created at 120 may be a master profile or a dependent profile. A dependent profile may be a profile that is dependent on one or more master profiles. Examples of the relationship between master profiles and dependent profiles are described in connection with FIGS. 2, 5A-5C, and 6A-6D below. In some embodiments, a master profile may also act as a dependent profile, and vice versa.

At 130, after a profile is created at 120, the user may adjust one or more settings of the profile to fit the user's particular preferences and/or needs. Non-limiting examples of the settings that may be adjusted by the user are described in more detail in connection with FIGS. 5A, 5B and 5C. In some embodiments, one or more of the settings for a profile may be pre-filled or automatically populated with default values, which may be based on information previously entered by the user creating the profile. For example, when an administrative user creates a dependent profile for a user that is dependent on a master profile, the dependent profile may have default settings that are the same or similar to the master profile. As another example, if a user already has one or more profiles, a newly created profile may have default values that are the same or similar to the settings for the user's one or more other profiles. In some embodiments, an administrative user may change one or more of the settings for a profile of another user at any time, including at the creation of the profile.

At 140, it may be determined whether the user chooses to publish content based on the settings adjusted by the user at 130, and/or other user input. Illustrative examples of how a user may choose whether to publish content are described in connection with FIGS. 2 and 6A-6D. If it is determined that the user chooses to publish a content item ("Yes" at 140), it may be determined at 150 if any accounts are linked to the profile that was created at 120. Examples of accounts that may be linked to a profile include any account where a user may publish content items to be seen by others on a private, semi-private, or public basis. For example, accounts may include any or all of the following: a TWITTER account; a FACEBOOK account; a MYSPACE account; a GOOGLE+ account; a TUMBLR account; a LINKEDIN account; a PINTEREST account; a blog; or any other suitable type of account. A profile may be linked to multiple accounts of each type, so long as the user of the profile (or an administrative user) may give permission to publish to the account. In some embodiments, before a content item is published, a user may select which accounts, if any, to publish the content.

If it is determined at 150 that there is at least one account linked to the profile and selected by the user, then the content item that was chosen by the user is published at 160. If no content item is chosen to be published ("No" at 140), or there are no accounts linked to the profile ("No" at 150), the process may be directed to 170 to determine if the user has chosen to return to the settings for the profile. If the user has chosen to return to the settings ("Yes" at 170), the process may be directed to 130, where the user may be allowed to further adjust the settings for the profile. Otherwise, the process moves back to 140, to determine if there is a content item chosen or selected to be published.

Figure 2:
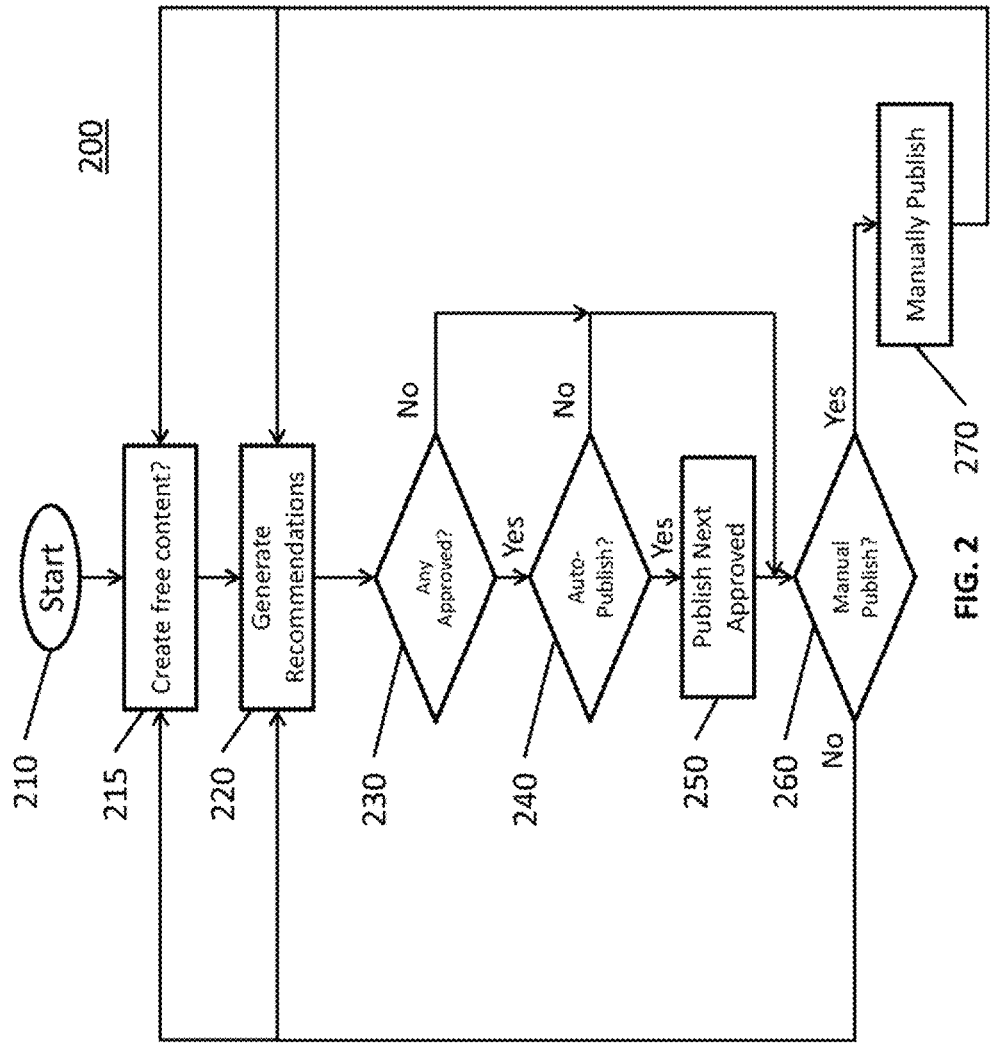
FIG. 2 is a flow chart of an illustrative process for recommending multiple content items and selecting from the recommended content items in accordance with some embodiments of the disclosed subject matter.

Referring to FIG. 2, as mentioned above, an example of a process 200 for allowing a user to select which content items, if any, to publish at 140 in accordance with some embodiments is illustrated. After process 200 begins at 210, the user may be provided with an opportunity to create free content at 215. For example, the user may create new, additional, or updated content items prior to or in between the generation of recommended content items. In a more particular example, FIG. 6A includes a display screen that includes an interface 604 for entering free text or free content. More particularly, the user may use interface 604 to create a content item, such as "Check out the latest features in the RallyDeck . . . " along with a URL or any other suitable link to the content. These newly created free content items may be included when determining which content items to recommend for publication. It should also be noted that, if free content items have been created after the recommendation of content items has been made at 220, the newly created free content items may be placed into a pool or grouping of available content items and the recommendation engine can update the corresponding scores and/or ranking for each content item (including the newly created free content items).

Process 200 then generates recommendations on particular content items to publish at 220. In some embodiments, generating recommendations about what content items to publish may include generating a score that approximates the popularity of the topics in each content item. An example of how such a score may be generated is described in more detail below with respect to FIG. 3. In some embodiments, generating recommendations may include automatically creating content items from content sources chosen by the user, and ranking the automatically created content items based on one or more variables, which may or may not include a score.

At 230, it may be determined whether there are any approved content items associated with the profile. If there are approved content items associated with the profile ("Yes" at 230), the process may be directed to 240. After a content item associated with a profile has been generated, the content item may be designated as a pending content item. A profile may have several different types of content associated with it, which may include pending content, approved content, and published content. These different types of content may be displayed to a user in any suitable manner to differentiate the different types of content. For example, approved content and pending content may be displayed to users in different areas or may be displayed in different colors. Examples of how pending, approved and published content may be displayed to a user are described with regard to the example in FIGS. 6A-6D and 7A-7C.

A user of the profile may designate any or all of the content items that are pending as approved content items by, for example, performing an action that changes the status of a pending content item to an approved state. In some embodiments, if a profile is a dependent profile associated with one or more master profiles, content items that are designated as approved in the master profile may be automatically associated with the dependent profile and designated as approved.

In some embodiments, a user may freely change the status of pending and approved content items by, for example, designating an approved content item as pending, or vice versa. In some embodiments, a user of a profile may delete content items that are pending, approved, or published. In some embodiments, the ability of the user of a dependent profile to change the status of content items, or delete content items may be restricted. For example, a user of a dependent profile may be restricted from designating content items that are approved by a corresponding master profile as pending. In another example, a user of a dependent profile may be restricted from deleting content items that are approved by a corresponding master profile. In yet another example, a user of a dependent profile may indicate a desire to delete a content item and, in response to providing the indication, an approval request may be transmitted to a user of a corresponding master profile.

In some embodiments, if a user of a dependent profile approves a content item, that content item or an indication of the approval may be transmitted to a user of the master profile for approval prior to designating the content item as approved. In such a case, the content item may be marked as "provisionally approved", "pending review," or any other suitable manner of marking content item to convey that the content item has been approved by the dependent profile, but has not yet been approved by the master profile. In some embodiments, the dependent profile may be allowed to publish some content without receiving approval from a user of the master profile, but the presence of certain terms or topics may trigger review of the content items by the user of the master profile before the content items may be published. A dependent profile with restrictions such as these may sometimes be referred to as a subordinate profile.

At 240, it may be determined if the auto-publishing setting has been selected in the settings. If the auto-publishing setting has been selected in the settings ("Yes" at 240), the process may be directed to 250, where the next approved item may be published if the conditions of the auto-publish setting are satisfied. An example of the auto-publish setting is described in connection with FIG. 5A.

It should be noted that, in some embodiments, the auto-publishing setting may perform more than publishing the next available content item on the list of recommended content items. Rather, in response to selecting the auto-publishing setting, it may be determined which content items are preferable to publish based on one or more criterion. For example, in response to selecting the auto-publishing setting, appropriate times for serving recommended content items may be determined. In a more particular example, the recommendation component of the mechanism or any other suitable component may determine timing characteristics for association with each recommended content item—e.g., best time of the day, preferred day of the week for the given term. It should be noted that the frequency in the settings may serve as a minimum time between posts or publications.

If there are no approved items at 230 ("No" at 230), and/or auto-publishing has not been selected ("No" at 240), the process may be directed to 260 and may bypass 250. At 260, regardless of whether any content item has been auto-published, it is determined if the user of the profile has chosen to manually publish a content item. If a user chooses to manually publish a content item ("Yes" at 260), the content item may be manually published at 270 to the corresponding account(s) the user has indicated to publish such a content item to, and process 200 returns back to generate recommendations of content items at 220 or returns back to provide the user with an opportunity to create free content items at 215. If the user chooses not to manually publish a content item, process 200 returns back to 220, where recommendations of content items are generated and/or process 200 returns back to 215, where the user is provided with an opportunity to create free content items (e.g., "Check out the latest features in the RallyDeck . . . " in interface 604 of FIG. 6A).

As an example of generating content, the user or an administrative user may provide authorization to collect real-time data on its behalf across multiple sources or multiple real-time data systems. This may include, for example, content assets that are owned, operated, licensed, and/or controlled by the user. This may also include, for example, other sources of real-time data, such as RSS feeds, or XML feeds from different sources, such as, news organizations, publishers, various Web sites, blogs, microblogs, etc. Collected real-time data may also include, for example, any suitable professionally published content (such as articles in an electronically published magazine, newspaper, or professional weblog) and/or any suitable user-generated content (such as personal weblogs, status updates on a social networking Web site FACEBOOK, MYSPACE, etc.), messages posted on a social messaging Web site (e.g., TWITTER), pages on a personal photography Web site, etc.). The data may be mined, scored (an illustrative example of which is described hereinbelow), and classified in order to determine the relative interest and the topic areas for the publishing entity as well as its owned or operated content assets.

It should be noted that content assets owned and operated by a user may include, for example, content that has been purchased by the user, content that the user has a right to distribute (e.g., by contract, agreement, fair use, or any other form of right to distribute), content that the user has a right or an agreement to promote, content that is in possession of the user (e.g., stored on an advertising server), etc. More particularly, the content may be scored and classified based at least in part upon the relative popularity of the content or the determined topic of the content with regard to the user's interests or topic areas as well as its relationship to its owned content. The relative relevance of matched content items is ranked in order for recommendation of publication.

The following process provides an illustrative example of the implementation of a prioritization system of the disclosed subject matter. In some embodiments, a user may provide an authorization for the prioritization system to collect real-time data on its behalf across multiple sources or multiple real-time data systems. The multiple sources and/or real-time data systems may include, for example, a social media network, a social messaging service, a social content sharing service, an e-mail message, an instant message, a short message service (SMS) message, a web service, a web log, and a search engine. This may also include, for example, content assets owned and operated by the user.

It should be noted that, in some embodiments, the user may set heuristic controls relating to relevance. This may, for example, allow the user to control how tight or loose the recommendation and scoring component of the system operates when discovering and/or recommending content for publication. In a more particular example, the publishing entity may set a particular score that must be attained prior to recommendation, such as at least a score of 80 out of 100, in some embodiments. In another more particular example, the publishing entity may set portions of a particular score that are achieved by a piece of content prior to recommendation, such as at least a score of 30 in a frequency component, at least a score of 40 in a recency component, and at least a score of 50 in a density component.

In some embodiments, real-time content and interest data associated with the publishing entity may be collected from real-time data systems. This data may be used to provide a rich interest and topic map for the user. The user's owned and operated content assets may be collected and indexed with regard to the previously collected topics and interests.

In some embodiments, real-time content and interest data associated with the user may be collected via explicit input of topics or keywords provided by the user. This data may be used to provide a rich interest and topic map for the user of topics that are of particular interest to the user, as well as topics that are less relevant or forbidden from consideration.

In addition, in some embodiments, the prioritization system may review and add the user's unpublished real-time content as a pending or approved content item for consideration for publication. For example, based on content and interest data from real-time data systems (e.g., particular social networks, particular weblogs, etc.), the prioritization system may recommend that the user publish particular pieces of content, re-sort the display order of content on a page, etc. Additionally or alternatively, the prioritization system may create an interest and topic map from data collected from multiple sources or real-time data systems (e.g., data from social networks) and determine which unpublished real-time content of the publishing entity should be presented to viewers.

In some embodiments, real-time content and interest data associated with the user may be derived from explicit keywords, content that user has input (feeds), content the user has shared or published, content engaged by the user's communities, and/or derived or explicit interests from the user's communities. The derived and explicit topics or interests may be used as targeting attributes for organic or paid advertisements to users.

In some embodiments, the prioritization system may, based on the interest and topics associated with the user, be used to discover all high potential real-time content across a user's connected network (e.g., content generated by other users having a relationship with that user). For example, the candidate content may be classified and scored for (a) contextual relevance to the user coupled with (b) a score measuring the relative relevance of the content to other users or a user base. It should be noted that the contextual relevance score may be determined for each candidate content item by matching the relevance of the candidate content text and entities to the interests and topics for the user derived or determined using the recommendation and scoring processes described herein. The content relevance score may ensure that the candidate content is relevant to the overall interest or topics of the user.

In some embodiments, the user may rely on the prioritization system to create promotional content items to be published into real-time data systems, such as social networks and advertising systems. In such embodiments, the prioritization system may programmatically author and structure the content to meet with the publishing environments requirements (such as TWITTER, FACEBOOK, etc.).

Figure 3:
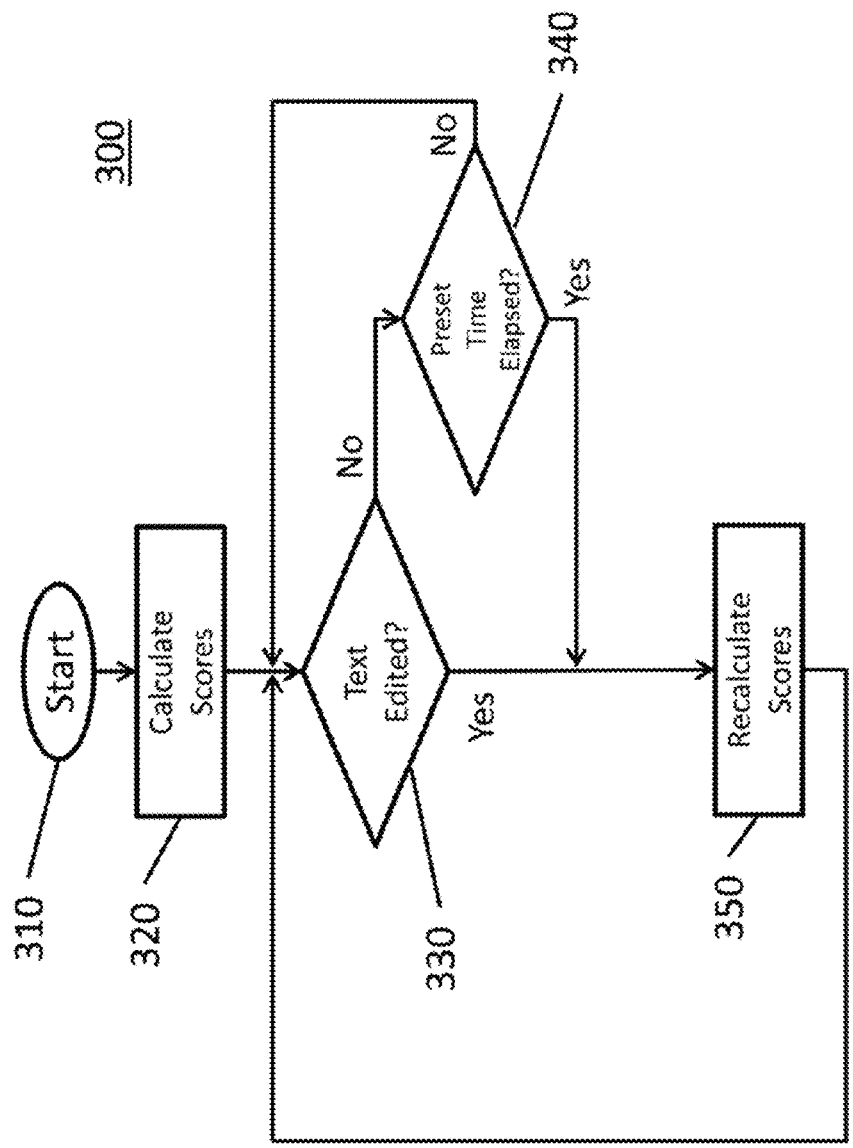
FIG. 3 is a flow chart of an illustrative process for calculating scores for content items for recommending and/or ranking content items in accordance with some embodiments of the disclosed subject matter.

Referring to FIG. 3, as mentioned above, an example of a process 300 for calculating scores for content as part of generating recommendations for content at 220 in accordance with some embodiments is illustrated. After process 300 begins at 310, scores for each content item may be generated at 320. In some embodiments, scores may be generated for each content item that has a status of pending and/or approved.

In accordance with some embodiments, scores may be generated by calculating the proximity of each topic of interest to the content item being scored. More particularly, a vector of representing dominant keywords derived from one or more real-time sources may be created for each topic of interest, a vector of keywords obtained from a content item or content snippet may be created for each content item, and a vector similarity score may be calculated that indicates the proximity or distance between the topic of interest vector and the content item vector. The score may represent frequency and scarcity in keywords or vocabulary between topics of interest and content items.

In a more particular embodiment, the vector similarity score may be calculated by determining cosine similarity, which may be represented as:

$$\text{similarity} = \cos(\theta) = \frac{A \cdot B}{\|A\|\|B\|} = \frac{\sum_{i=1}^{n} A_i \times B_i}{\sqrt{\sum_{i=1}^{n} (A_i)^2} \times \sqrt{\sum_{i=1}^{n} (B_i)^2}}$$

It should be noted that A and B represent each vector—e.g., the topic of interest vector and the content item vector.

In another more particular embodiment, a keyword score in a vector of keywords may be calculated by using a TF-IDF weighting or scoring approach for a keyword in a set of related content snippets against a broad vocabulary. For example, the TD-IDF score of value may increase proportionally to the number of times a keyword appears in the content items or content snippets, but may also be offset by the frequency of the keyword in the content items or content snippets.

Upon calculating the similarity score for each topic of interest, the scoring mechanism may determine the topic of interest with the highest score (most relevant term). Additionally, the scoring mechanism may determine the product of the highest similarity score with a velocity score that is calculated based on dominant entity frequency, recency, and density to product a final or revised score. This may allow the mechanisms to score the content items by trends and relevance. It should be noted that, in some embodiments, the score is kept in the range of about 0.5 and 1.5 to scale the final score into a predictable range. For example, a score below 0.5 is adjusted to 0.5 and a score above 1.5 is scaled down to 1.5.

In a more particular embodiment, the final score for ranking content items may be represented as:

RankingScore(content$_n$)=max{RelevanceScore(topic$_1$, content$_n$), . . . , RelevanceScore(topic$_m$, content$_n$)}×VelocityScore(content$_n$)

Additionally or alternatively, scores may also be generated that take into account at least one of the following: recent popularity of terms used in the content items; trends in the popularity of terms used in the content items; the presence in the content items of topics and interests specified in the profile; the presence of excluded topics specified in the profile; and any suitable combination thereof.

In an example of a process for generating scores, the process may begin by receiving topical entities of text. It should be noted that the determination of topical entities and/or cleaning, refining, supplementing, and/or expanding the topical entities may be performed prior to receiving the topical entities of text.

The topical entities of text may be used as query inputs into real-time information sources. Examples of real-time information sources may include, among others, social media networks (e.g., FACEBOOK, LINKEDIN, MYSPACE, etc.), social networking services (e.g., TWITTER), content sharing services (e.g., DIGG), web services (e.g., SHARETHIS, ADDTHIS, and BIT.LY), weblogs or blogs, and/or search engines (e.g., GOOGLE).

This query may result in a recent portion of real-time content. A vector may then be generated based on the real-time content.

A density score for this real-time content may be calculated as the standard deviation of the time between consecutive snippets. In a particular example, the standard deviation of the times between consecutive tweets, or postings containing a particular topical entity may be calculated. The standard deviation may indicate how close the tweets or postings containing the particular topical entity are. When tweets or postings are close in time (i.e., frequent), the standard deviation is a small number and the final score is higher.

This density score may observe the rate of change over time between real-time content elements. For example, the density score may compare the density of a particular content snippet with the density of the particular content snippet at a previous time. This may provide a relative understanding of the relative popularity of the real-time content and topics over the time period observed as well as a directional indicator of its popularity.

In some embodiments, the recency of the real-time content may be observed. This observation may be directed to real-time content generated in close proximity in relationship to time to the request for the score. The score for recency may observe the time distance and its distribution between the most recent real-time content and the time of the score request. For example, the recency score may be an integer that represents the average number or distribution of the number of seconds ago that the last N number of tweets or postings about a particular entity was published. It should be noted that the smaller the recency average number, the smaller the integer that the recency average is mapped to for producing the final score. The recency factor may provide a score to bias the results towards the direction of popularity at the time of the score request.

In some embodiments, the mechanism may combine the density score with the recency score into a score that favors recency but also accounts for density. The score may be in the range of 0 to 1, or any suitable number. The combination of the density score and the recency score may provide a relative measure of how popular the topic is among real-time data participants. This combined score may be represented as follows:

$$TV_{Score(entity)} = 1 - \frac{(\text{Recency\_Bucket} \times \text{Score\_Magnifier} + \text{Density\_Score})}{\text{Normalization\_Factor}}$$

where Score_Magnifier is $10^6$ and Normalization_Factor is $10^8$. This may be referred to herein as the velocity score or the score, interchangeably.

It should be noted that a smaller recency score generates a higher $TV_{Score}$ as the density score plays a contributing role when two entities have the same recency score.

In some embodiments, by tracking the velocity score over time, the mechanism may also derive whether a topic is accelerating or decelerating in popularity in the real-time web and as such influence the relative ranking of content in real time. For example, this may be represented as the derivative of the velocity score over time:

$$\text{Popularity acceleration (entity)} = \frac{d(\text{TV\_Score})}{dt}$$

In some embodiments, the velocity score for various topical entities may be combined to yield a score for each content item that is either pending or approved. In some embodiments, these scores may range from 0 to 1, with a higher score representing a more highly ranked content item. In some embodiments, these scores may range from 0 to 100, or any other suitable range that will inform a user of which content items are rated as containing the most popular content.

In some embodiments, the popularity acceleration (and/or deceleration) may be taken into account when calculating a score, where a topic that is trending more popular may yield a higher score which allows a user to take advantage of topics that are becoming more popular, or avoid topics that are becoming less popular.

In some embodiments, a user may enter topics in the profile, where if a content item contains words that match the topic entered by the user, then the content item will be given a higher score. This higher score may be generated by changing the multiplier for words that are related to the topics entered by the user. Alternatively, the higher score may be generated by adding a constant for each matching term to the overall score, or any other suitable method for biasing the score for items containing words related to the user entered topics. Topics are described in more detail in connection with the example illustrated in FIG. 5B.

In some embodiments, a user may enter excluded topics in the profile, where if a content item contains words that match the excluded topic entered by the user, then the content item will be discarded or given a lower score. In some embodiments, the user may be allowed to choose how to treat content items containing excluded topics. Excluded topics are described in more detail in connection with the example illustrate in FIG. 5B.

After scores have been calculated at 320, the process may be directed to 330 where it is determined if the text of any of the content items has been edited. If none of the content items have been edited ("No" at 330), the process may be directed to 340 where it is determined if a preset amount of time has passed since scores have been calculated. If the preset amount of time has passed at 340 ("Yes" at 340) or if the text of a content item has been edited ("Yes" at 330), the scores for pending and approved content items may be recalculated at 350. Otherwise, the process returns back to 320. In some embodiments, the preset time for recalculating the scores may be, for example, one minute, five minutes, thirty minutes, etc.

Figure 4A:
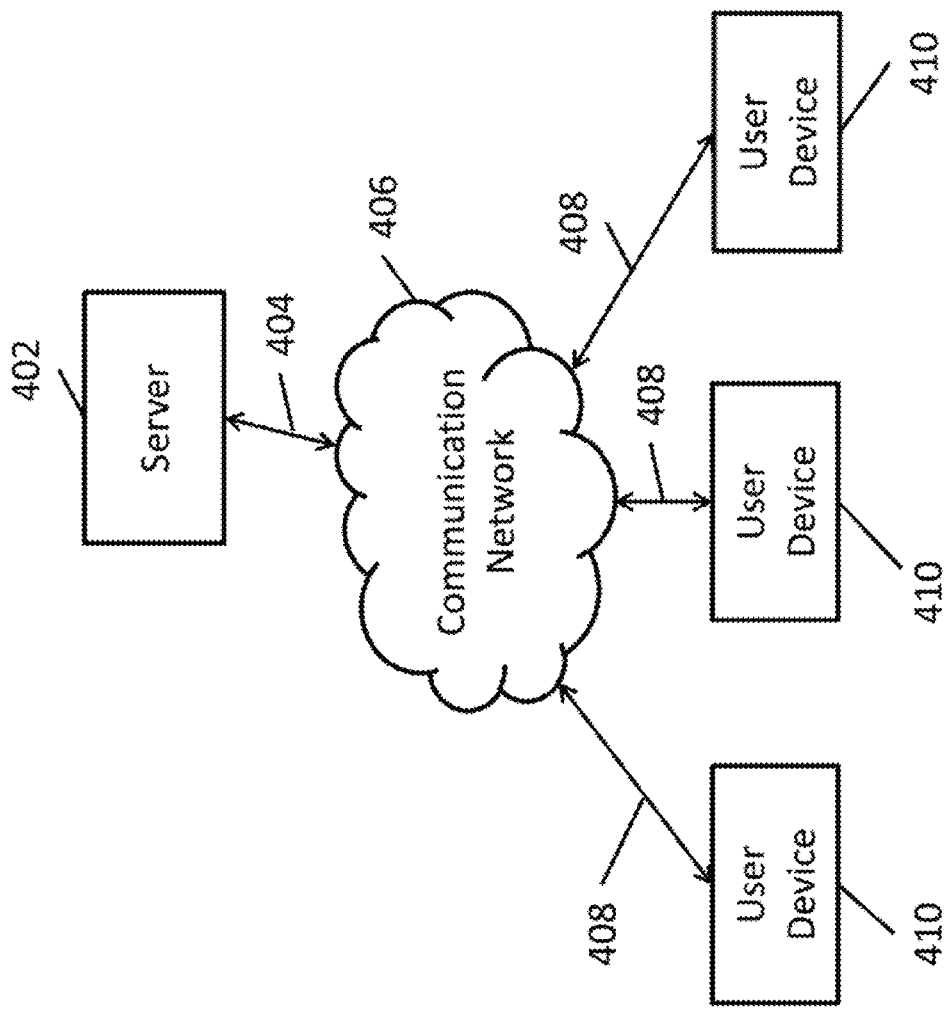
FIG. 4A is a diagram of an illustrative system on which the mechanisms for generating, recommending, and publishing content items can be implemented in accordance with some embodiments of the disclosed subject matter.

FIG. 4A shows an example of a generalized schematic diagram of a system 400 on which the content generation, prioritization, and/or scoring mechanisms described herein may be implemented as an application in accordance with some embodiments. As illustrated, system 400 may include one or more user devices 410. User devices 410 may be local to each other or remote from each other. User devices 410 may be connected by one or more communications links 408 to a communications network 406 that may be linked via a communications link 404 to a server 402.

System 400 may include one or more servers 402. Server 402 may be any suitable server for providing access to the application, such as a processor, a computer, a data processing device, or a combination of such devices. For example, the application may be distributed into multiple backend components and multiple frontend components or interfaces. In a more particular example, backend components, such as data collection and data distribution may be performed on one or more servers 402. Similarly, the graphical user interfaces ("GUIs") displayed by the application, such as a user interface for adjusting settings, a user interface for publishing content and a user interface for displaying reports, may be distributed by one or more servers 402 to user device 410.

More particularly, for example, each of the user devices 410 and server 402 may be any of a general purpose device such as a computer or a special purpose device such as a client, a server, etc. Any of these general or special purpose devices may include any suitable components such as a processor (which may be a microprocessor, digital signal processor, a controller, etc.), memory, communication interfaces, display controllers, input devices, etc. For example, user device 410 may be implemented as a personal computer, a personal data assistant (PDA), a portable email device, a multimedia terminal, a mobile telephone, a set-top box, a television, a game console, etc.

In some embodiments, any suitable computer readable media may be used for storing instructions for performing the processes described herein, may be used as a content distribution that stores content and a payload, etc. For example, in some embodiments, computer readable media may be transitory or non-transitory. For example, non-transitory computer readable media may include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media may include signals on networks, in wires, conductors, optical fibers, circuits, any suitable media that is fleeting and devoid of any semblance of permanence during transmission, and/or any suitable intangible media.

Referring back to FIG. 4A, communications network 406 may be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), or any suitable combination of any of such networks. Communications links 404 and 408 may be any communications links suitable for communicating data between user devices 410 and server 402, such as network links, dial-up links, wireless links, hard-wired links, any other suitable communications links, or a combination of such links. User devices 410 may enable a user to access features of the application. User devices 410 may be personal computers, laptop computers, mainframe computers, dumb terminals, data displays, Internet browsers, personal digital assistants ("PDAs"), two-way pagers, wireless terminals, portable telephones, game consoles, any other suitable access device, or any suitable combination of such devices. User devices 410 and server 402 may be located at any suitable location. In one embodiment, user devices 410 and server 402 may be located within an organization. Alternatively, user devices 410 and server 402 may be distributed between multiple organizations.

FIG. 4B illustrates an example of hardware 400 where the server and one of the user devices depicted in FIG. 4A are illustrated in more detail. Referring to FIG. 4B, user device 410 may include a processor 412, a display 414, an input device 416, and a memory 418, which may be interconnected.

In some embodiments, memory 418 contains a storage device for storing a computer program for controlling processor 412.

Processor 412 may use the computer program to present on display 414 the application and data received through communications link 408 and commands and values transmitted by a user of user device 410. It should also be noted that data received through communications link 408 or any other communications links may be received from any suitable source. Input device 416 may be a computer keyboard, a cursor-controller, dial, switchbank, lever, or any other suitable input device as would be used by a designer of input systems or process control systems.

Server 402 may include processor 422, display 424, input device 426, and memory 428, which may be interconnected. In some embodiments, memory 428 may contain a storage device for storing data received through communications link 404 or through other links, and also receives commands and values transmitted by one or more users. The storage device may further contain a server program for controlling processor 422.

In some embodiments, the application may include an application program interface (not shown), or alternatively, the application may be resident in the memory of user device 410 or server 402. In another suitable embodiment, the only distribution to user device 410 may be a graphical user interface which allows a user to interact with the application resident at, for example, server 402.

In one particular embodiment, the application may include client-side software, hardware, or both. For example, the application may encompass one or more Web-pages or Web-page portions (e.g., via any suitable encoding, such as Hyper-Text Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

Although the application is described herein as being implemented on a user device and/or server, this is only illustrative. The application may be implemented on any suitable platform (e.g., a personal computer ("PC"), a mainframe computer, a dumb terminal, a data display, a two-way pager, a wireless terminal, a portable telephone, a portable computer, a palmtop computer, an H/PC, an automobile PC, a laptop computer, a cellular phone, a personal digital assistant ("PDA"), a combined cellular phone and PDA, a game console, etc.) to provide such features.

Figure 5A:
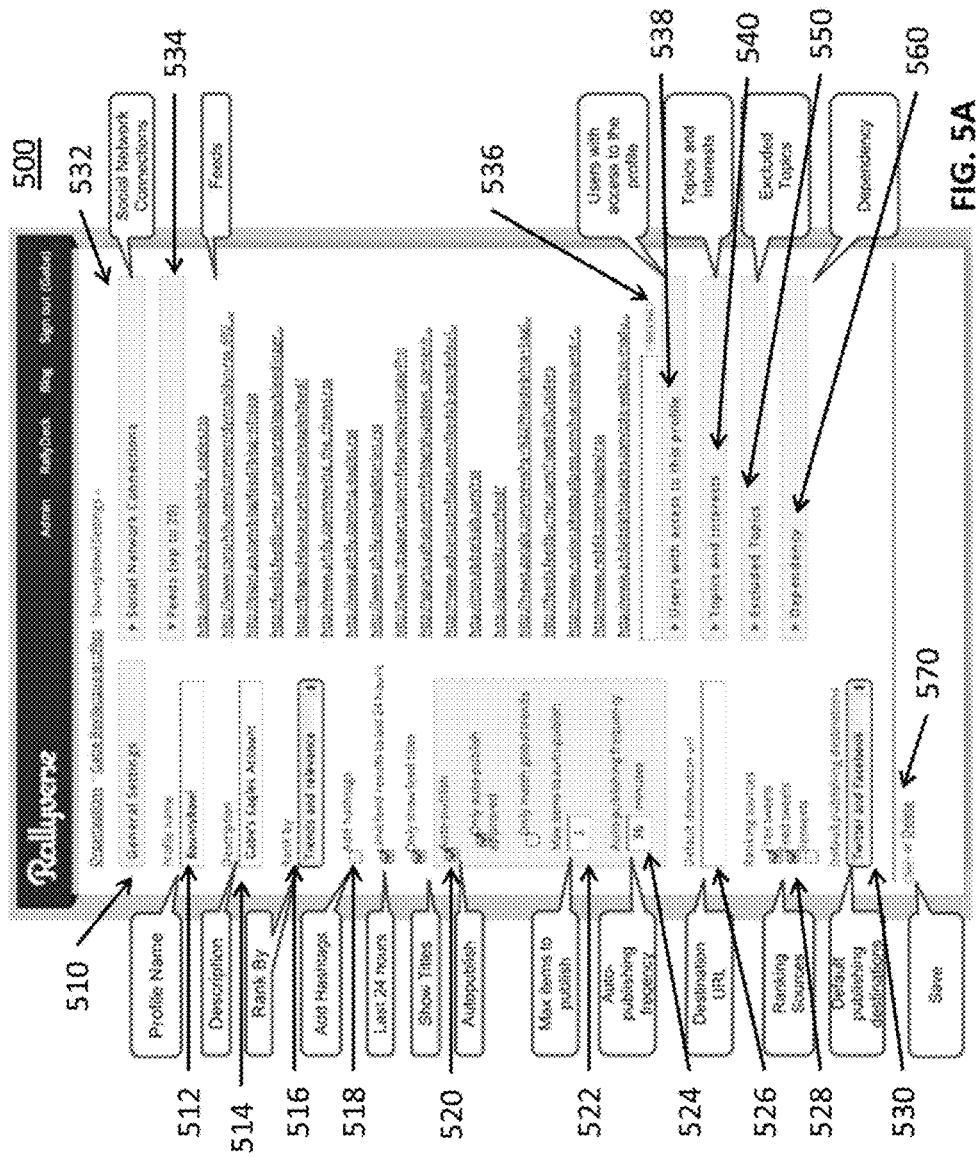
FIGS. 5A-5C are illustrative display screens that include interfaces for adjusting settings associated with a profile in accordance with some embodiments of the disclosed subject matter.
Figure 5B:
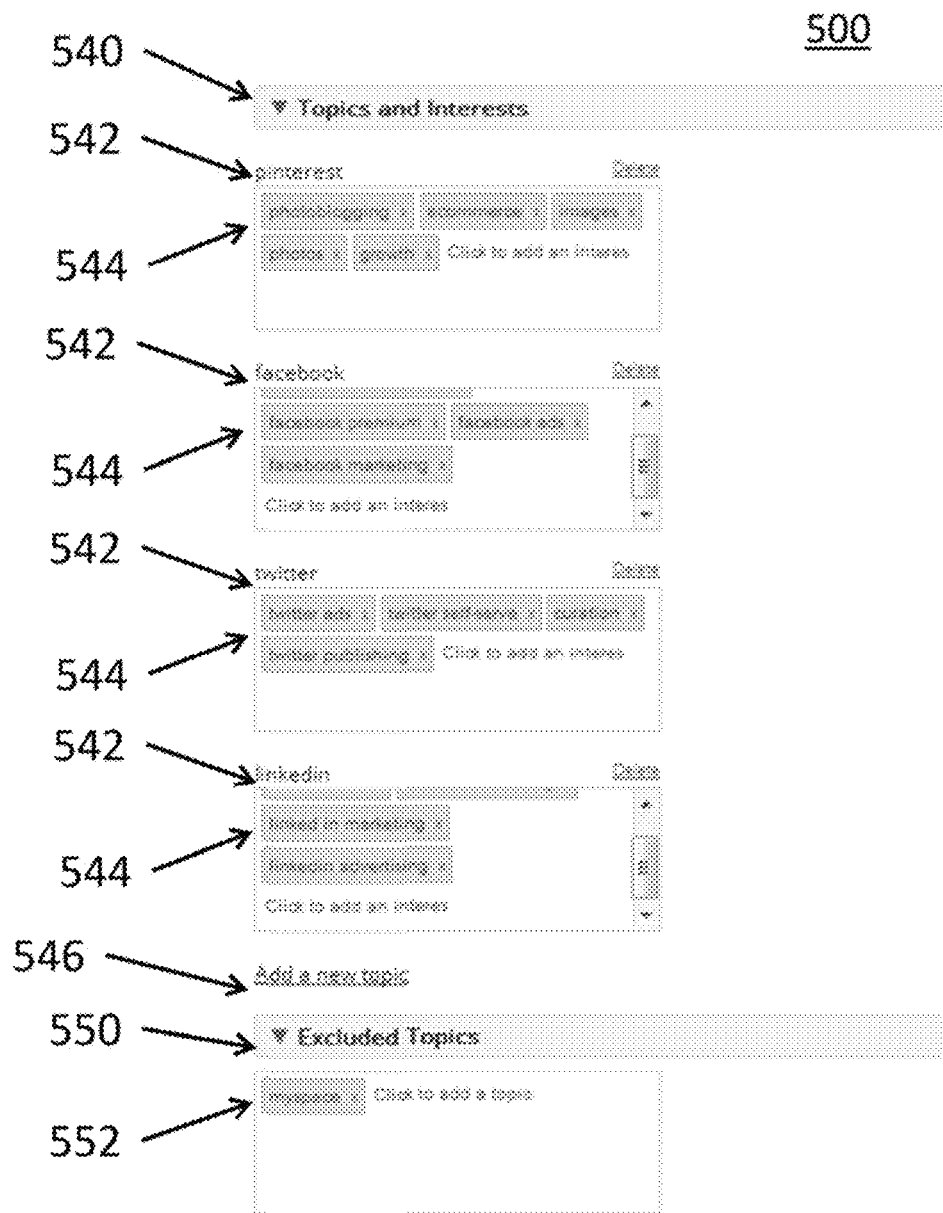
Figure 5C:
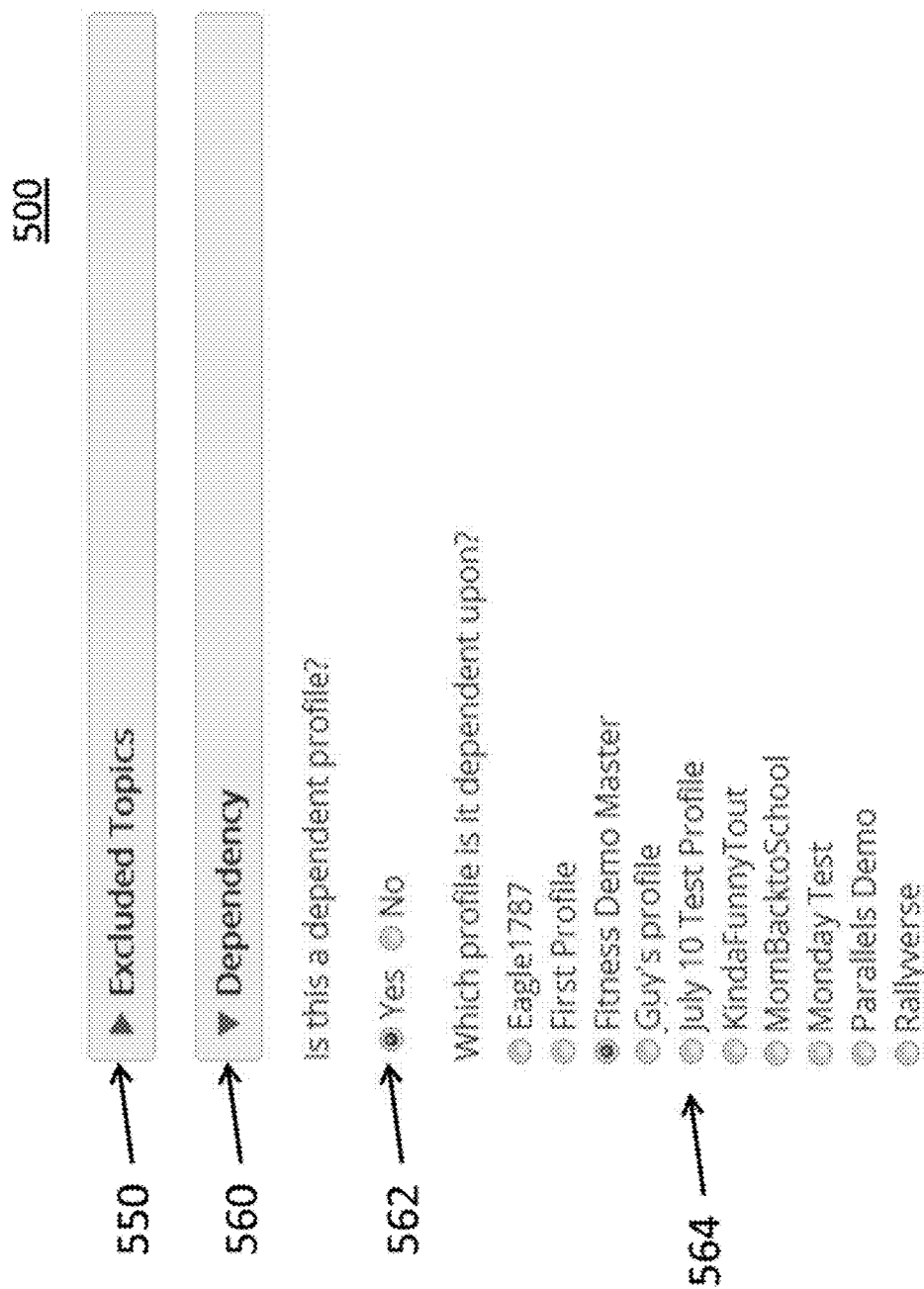

Turning to FIGS. 5A, 5B and 5C, examples of a user interface for adjusting the settings associated with a profile in accordance with some embodiments are illustrated. FIG. 5A illustrates an example of a user interface 500 for adjusting the settings for a profile at 130. For example, interface 500 may include general settings 510, including: a field 512 for entering a profile name; a field 514 for entering a description of the profile; a dropdown 516 for selecting how to rank content items 516; a checkbox 518 for selecting whether to automatically attach a hashtag(s) to content items; a checkbox 520 for selecting whether to auto-publish content items; a field 522 for entering a maximum number of items to auto-publish; a field 524 for entering how often to auto-publish; a field 526 for entering a default destination; check boxes 528 for selecting where potential content items are to be generated from; and a dropdown 530 for selecting default publishing destinations.

Field 512 may be used by the user or an administrative user to add a name for the profile or to change the name of the profile after the profile has been created. In some embodiments, a user may be restricted from changing the name after the profile has been created. In some embodiments, the profile name may be prefilled or automatically populated in field 512 if the user is part of an organization and the profile is a dependent profile. For example, in the case of a vehicle manufacturer, such as GENERAL MOTORS, the manufacturer may maintain a master profile. In such an example, the manufacturer may encourage dealers of the manufacturer's vehicles to maintain dependent profiles to market the manufacturer's vehicles in particular geographic regions. In this case, the field 512 may be prefilled or automatically populated with the dealer's name or an identification number that the manufacturer uses to identify the dealer. The profiles for each dealer may be created by an administrative user employed by the manufacturer, or may be created by a user employed by the dealer. Field 514 for entering a description of the profile may have similar features to field 512. In some embodiments, one of field 512 or 514 may be eliminated, or may be replaced with a name without the ability to change the name.

In some embodiments, the user may be provided with an option for indicating how content items are scored. Dropdown 516 may be a dropdown menu that allows the user to adjust how content items are scored by the scoring process. For example, the user may choose to score based on trends, trends and relevance, time, or any combination of these. As described in the above-mentioned equations and generally herein, scoring based on trends may score content items based on a calculated velocity score calculated based on dominant entity frequency, recency, and density. As also described in the above-mentioned equations and generally herein, scoring based on trends and relevance may score content items based on overall and/or global trends in real-time information sources, and based on topics and/or interests entered in topics and interests settings. Scoring based on time may score content based only on the recency of the content items, but not based on the relevance of the content items to overall and/or global trends in real-time information sources.

In some embodiments, the user may be provided with an option for creating and/or applying hashtags. Checkbox 518 may allow the user to select whether the user prefers hashtags to be automatically inserted into content items. If checkbox 518 is checked, hashtags (for example, #olympics2012, etc.) may be inserted into content items created by the processes described herein. These hashtags may be generated based on a prominent or dominant trend entity present in or derived from the content item, where the relative prominence or dominance may be determined based on the scoring described herein. In some embodiments, a hashtag is only attached corresponding to the most prominent (or dominant) topic and/or trend. In some embodiments, a hashtag may be attached for each topic or trend that has a relevancy above a predetermined threshold, where the maximum number may be limited to some arbitrary number, such as one, two, three, etc. In some embodiments, an automatically created hashtag corresponding to a content item is provided to the user for approval and/or modification. In some embodiments, the hashtag may be used as targeting attributes for organic or paid advertisements to users.

In some embodiments, the user may be provided with an option for automatically publishing content items. Checkbox 520 may allow the user to select whether content items are to be auto-published to accounts associated with the profile. If checkbox 520 is checked, items in the approved and/or pending categories may be automatically published to accounts associated with the profile in accordance with the other settings set by the user. In some embodiments, only content items categorized as approved are auto-published. In some embodiments, content items marked as approved, as well as pending content items that have a score above a preset or user adjustable threshold may be auto-published. In some embodiments, non-approved items with a score over a preset or user-adjustable threshold may be auto-published if there are no approved content items available to publish. In some embodiments, any content that has the highest score among approved and/or pending content may be auto-published. If checkbox 520 is unchecked, content items are not auto-published to any accounts that may or may not be associated with the profile. In some embodiments, the mechanisms may take into account other criterion in addition to the calculated score for auto-publishing, where such criterion may include, for example, the time in the day, the day of the week, and the category of the judged content. Additionally, by using historical performance, the mechanisms may prioritize the scored content for publishing.

In some embodiments, the user may be provided with options for publishing content items, such as the number of content items to publish within a given time period. Fields 522 and 524 may allow the user to select how many content items to post over a given period of time. For example, the user may enter "1" in field 522 and "60" in field 524. In this example, if checkbox 520 is checked, content items are auto-published at a rate of a maximum of one item every hour. As another example, the user may enter "5" in field 522 and "20" in field 524. In this example, if checkbox 520 is checked, content items are auto-published at a rate of a maximum of five items every twenty minutes. As described above, the content items that the auto-publishing feature publishes may be based on the user's preferences. In a particular example, where only approved items may be auto-published, the approved item with the highest score is auto-published when enough time has elapsed since the last auto-publication. In some embodiments, the time between publications may be varied randomly, or semi-randomly to give the appearance that the content is not automatically being published every hour on the hour, for example. In some embodiments, the user may choose a range of time over which auto-publishing may occur. For example, the user may choose to publish only from 9 am to 5 pm local time. As another example, the user may choose to publish at all times of the day and night. In some embodiments, if a user chooses to manually publish a content item at 270, this may count toward the maximum number of auto-published items entered in field 522. For example, if auto-publishing is turned on and the maximum number is set to two items every hour, then if a user manually published two content items in an hour, it may be determined that no items will be auto-published for the next hour. In some embodiments, manually published content items may be ignored for the purpose of auto-publishing content items.

In some embodiments, the user may be provided with options for indicating a default link to be placed for the content to account for no link being placed in the content item. Field 526 may allow the user to enter a default uniform resource locator (URL) to include in all content items that do not have a URL already. For example, the user may enter a uniform resource locator associated with the user. In such an example, a link containing the URL, or a shortened form of the URL, where appropriate, may be inserted into any content item that does not already contain a link.

Checkboxes 528 may allow a user to choose which sources may be scored and recommended for publication. In the example of FIG. 5A, sources that the user may choose from include "free tweets," "feed tweets," and "retweets." In this example, free tweets are content items that may be manually written by the user, and feed tweets are content items that may be automatically generated from feeds or other sources entered by the user to be used to gather content. Retweets may be content from an account that is associated with another user of a social messaging service, and the account may have some relationship to an account linked to the profile. For example, a retweet may come from an account that is "following" a TWITTER account linked to the profile, from a "fan" of a FACEBOOK page associated with the profile, etc. There may also be other sources of content that a user may select to have scored and possibly recommended. For example, advertisements that the user may purchase or advertisements that the user has purchased may be selected as a source.

In some embodiments, the user may be provided with default publication options. Dropdown 530 may allow a user to choose which platforms to publish to by default. For example, if a user has a FACEBOOK account and a TWITTER account linked or otherwise connected to the profile, the user may choose to publish to one or the other of the platforms by default, to publish to both services, or to neither service. This feature may be implemented as a checkbox for each linked account that allow the user the ability to publish by default to any or all of the linked accounts, or any other suitable interface.

Interface 500 may further include other settings, such as, for example: linked accounts settings 532 (shown in FIG. 5A as social network connections); feeds 534 that content items may be automatically generated from; a field 536 for adding a feed to feeds 534; user access settings 538; topics and interests settings 540; excluded topics settings 550; dependency settings 560; a save option 570; any other suitable settings; and/or any suitable combination thereof.

Linked accounts settings 532 may allow a user to connect various accounts to the profile. For example, the user may connect any suitable account that the user owns or has access. In another example, the user may connect an account where the user has a right or permission to publish content.

Feeds 534 may be content sources that the user or an administrative user has entered for use in generating recommended content items. Feeds 534 may be RSS feeds, XML feeds, a newspaper Web site, a blog, a content management system (CMS), a thirdparty application programming interface (API), or any other suitable source of real-time data. The process for automatically generating content items described above may mine, score, and/or classify data from feeds 534 to generate content items recommended for posting in accordance with some embodiments. Feeds 534 may be associated with field 536 that may allow a user or administrative user to enter new sources of information to add to feeds 534. In some embodiments, any feed in feeds 534 may be deleted by a user or an administrative user in any suitable manner, such as by way of a delete button and dialog box confirming deletion. In some embodiments, one or more feed(s) in feeds 534 may be permanent, and a user may be restricted from deleting such a feed. In some embodiments, the number of feeds that a user may add may be limited to some finite number. For example, each profile may be limited to ten feeds, 15 feeds, twenty feeds, etc. In some embodiments, the number of feeds that may be added are not limited to a finite number. In some embodiments, the number of feeds that may be added may be associated with the size of a payment from the user for use of the profile.

User access settings 538 may allow a user or an administrative user to grant access to the profile to one or more other users that are associated with the user or administrative user in some way. For example, multiple users at the same organization may be given access to the profile, or a user that works for a marketing company hired by the user may be given access to the profile.

Although particular examples of checkboxes and drop-down menus were described above, there are merely illustrative. These features may be implemented in any suitable manner and the particular examples are intended to be non-limiting.

Turning to FIG. 5B, an example of topics and interests settings 540, as part of interface 500 is shown in accordance with some embodiments. Topics and interests settings 540 may include various topics 542, where each topic is further defined by a number of interests 544. In some embodiments, these topics and/or interests may be used in generating a score, where if a representing scored keyword vector for a content item is similar to a representing scored vector of keywords for topics or words that match with the topics 542 and/or interests 544, the content item may be given a higher score. For example, as described above, a vector of representing dominant keywords derived from one or more real-time sources may be created for each topic of interest, a vector of keywords obtained from a content item or content snippet may be created for each content item, and a vector similarity score may be calculated that indicates the proximity or distance between the topic of interest vector and the content item vector. Accordingly, the closer in similarity between the two vectors results in a higher score.

In some embodiments, determining whether there is a similarity between topics 542 and/or interests 544 and the content item may include finding synonyms, truncations, misspellings, and/or other similarities to topics 542 and/or interests 544, and also determining if there is match between any of these and the content item. In some embodiments, a match to synonyms, truncations, misspellings and/or other similarities may result in a lower score increase than an exact match to a topic 542 and/or interest 544. In some embodiments, the number of topics 542 may be limited. For example, the number of topics may be limited to five, seven, ten, 15, or any other suitable number. In some embodiments, the number of interests 544 associated with each topic 542 may be limited to five, seven, ten, or any other suitable number.

Topics and interests settings 540 may also include a new topic option 546. New topic option 546 may allow a user to add a new topic to topics and settings 540. New interests 544 may be added to an existing topic 542 by selecting a box below the topic 542, or any other suitable means of adding a new interest. Interests may be deleted by selecting an "X" displayed in conjunction with the interest, or any other suitable means of deleting an interest.

Excluded topics settings 550 may include one or more excluded topics 552 presented in a list or in a box. Excluded topics may be used to filter out content items that contain references to the excluded topics 552. Examples of excluded topics 552 that may be entered in excluded topics settings 550 may include brand names of competitors, terms that are not aligned with the user's brand objectives, general negative terms around the user's business, or any other terms the user wants to avoid publishing. If a content item contains a match to an excluded topic 552, the content item may have its score lowered, may be automatically excluded from a list of pending items, may never be automatically created, may be added to a list of excluded items for possible review, or any suitable combination thereof. In some embodiments, determining whether there is a match between excluded topics 552 and the content items may include finding synonyms, truncations, misspellings, and/or other similarities to excluded topics 552, and determining if there is match between any of these and the content item. In some embodiments, the proximity of excluded topics 552 to other terms may be used to determine if there is a match to an excluded topic 552. For example, negative terms that appear in close proximity with a brand that is owned by the user may be considered a match to excluded terms, but would not be a match if the appeared elsewhere in a content item.

Turning to FIG. 5C, an example of dependency settings 560, as part of interface 500 is illustrated in accordance with some embodiments. As used herein, a dependent profile may be a profile that has limited or restricted access to the content item generation, prioritization, ranking, and/or scoring mechanisms and may be subject to the content generation decisions and/or approvals by a master profile. For example, actions performed by a user of a dependent profile may remain pending until approval is received by a user of a master profile. In another example, actions performed by a user of a master profile (e.g., selection of a content item for publication, scoring rules, etc.) may also be performed on content associated with a user of a dependent profile.

Dependency settings 560 may include radio buttons 562 and 564. Radio buttons 562 may allow a user to designate whether the profile is a dependent profile, where the buttons are associated with "yes" and "no". Radio buttons 564 may allow a user to designate which master profile(s) the profile depends from. In the example shown in FIG. 5C, the profile is a dependent profile (the "yes" radio button 562 is selected), and the profile depends on master profile Fitness Demo Master (the corresponding radio button 564 is selected). In some embodiments, the radio buttons 562 and 564 may be replaced with any suitable mechanism, such as a dropdown menu, checkboxes, etc. In the example of FIG. 5C, only a single master profile may be selected. Alternatively, in some embodiments, a dependent profile may be allowed to depend from one or more master profiles. For example, in the case of the owner of several vehicle dealerships, where the dealerships may sell different brand names of vehicles, a profile for an individual dealership may depend from a master profile associated with the owner of the dealership, and a master profile of the manufacturer of the brand of vehicles. More particularly, a dealer may own a TOYOTA dealership and a FORD dealership, and the profile for the FORD dealership may be dependent on a master profile of the dealer and a master profile of FORD.

Figure 6A:
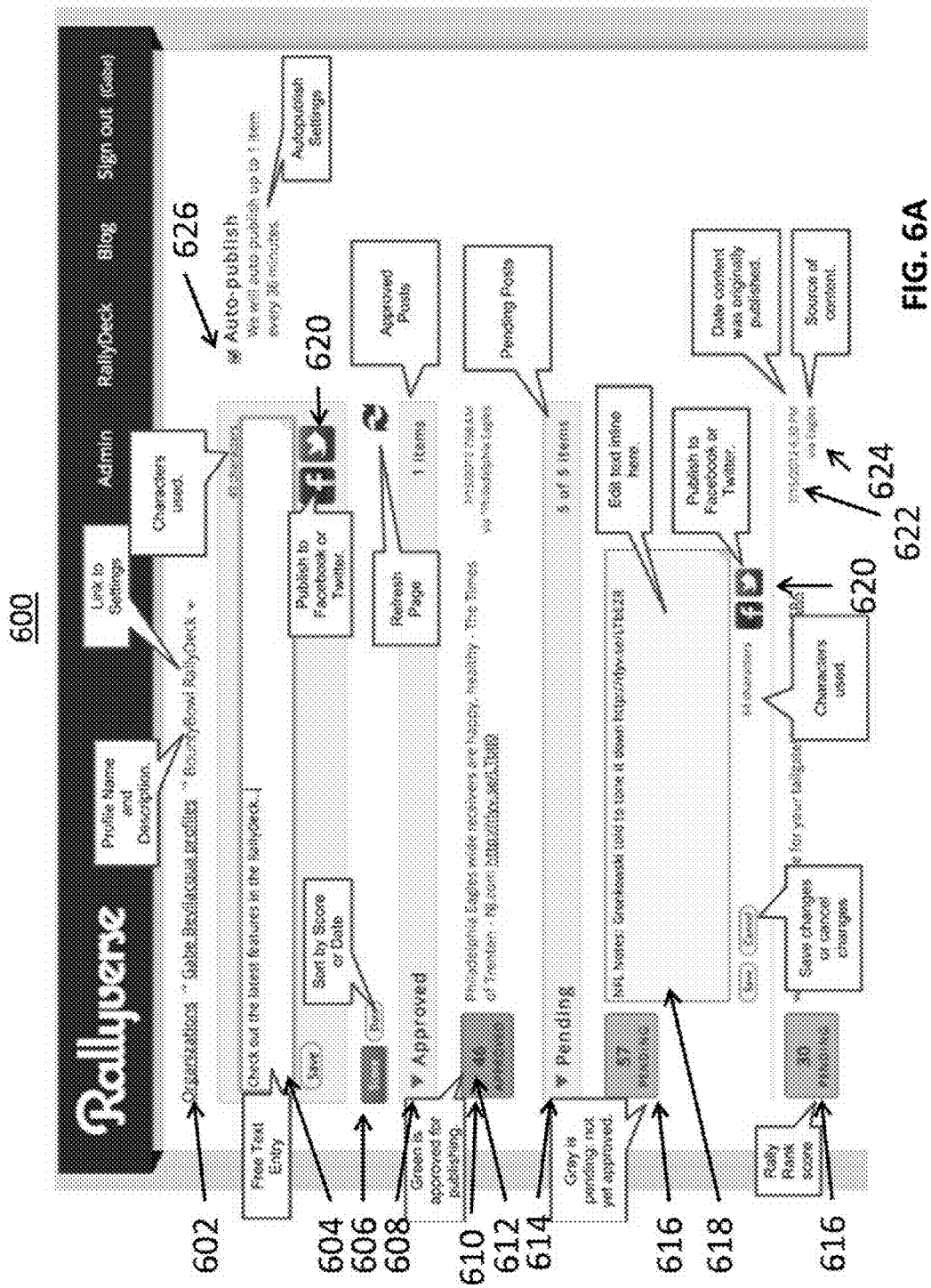
FIGS. 6A-6D are illustrative display screens that include interfaces for publishing recommended and/or scored content items in accordance with some embodiments of the disclosed subject matter.

FIGS. 6A to 6D are examples of a user interface 600 for publishing recommended and scored content items in accordance with some embodiments. As shown in FIG. 6A, interface 600 may include navigation links 602, a free text box 604, sorting buttons 606, an approved section 608, an approved content item 610, a score 612 for each content item, a pending section 614, pending content items 616, an edit text box 618, publish buttons 620, an example of a time stamp 622, an example of a source identification 624, and a checkbox 626 to turn auto-publish on or off from interface 600.

Navigation links 602 may allow the user to easily navigate to view all of the profiles that the user is allowed to access. In the example of FIG. 6A, selecting "Gabe Bevilacqua profiles" from navigation links 602 in interface 600 may allow the user to see all profiles in "Gabe Bevilacqua profiles" that they are allowed to access. As a further example, in FIG. 6A, selecting "Organizations" from navigation links 602 may allow the user to see all profiles in the user's organization that the user is allowed to access. In some embodiments, the user may be shown all profiles within the level of the organization selected, but may not be allowed to select profiles that they are not allowed to access. In some embodiments, an administrative user may select any profile within an organization, and may adjust settings, and perform any other actions that a user with access to the profile would be able to perform. Navigation links 602 may also have links to settings interface 500 and reports, described below, which may be given in the form of a link, or as a dropdown menu from another part of the navigation links 602. In some embodiments, navigation links 602 may be provided in any suitable form, including forward and back buttons, dropdowns, radio buttons, etc.

Free text box 604 may allow the user to create a new content item. For example, the user may use free text box 604 to insert a text snippet describing a piece of content and insert a link to the content. In another example, the user may use free text box 604 to insert a text snippet describing a piece of owned content and select a link to the owned content. A content item created in free text box 604 may be saved using a save button, cancelled, or immediately published using publish button 620. In some embodiments, a content item created in free text box 604 and saved may be designated as a pending content item. In some embodiments, a content item created in free text box 604 and saved may be designated as an approved content item. In some embodiments, a content item created in free text box 604 and saved may be designated as a pending content item, or as an approved content item according to the users set preferences. Once created, a free content item may be ranked in conjunction with other content items from the sources selected by the user.

Sorting buttons 606 may allow the user to sort the content items by score, by date, alphabetically, or by any other suitable category for sorting.

Approved section 608 may contain content items that have been approved for publishing. As described above, content items may be designated as approved in various ways. For example, a content item approved by a master profile may be automatically approved in a dependent profile. As another example, a user may manually approve content items that are listed in pending section 614. As another example, content items with a score over a threshold may be automatically approved.

Approved content item 610 may be a content item that has been approved in connection with the profile, in any of the various way described herein. An approved content item 610 may be distinguished from pending content items by, for example, being a different color, being a different shape, having a different label, simply being included in approved section 608, or any other suitable manner of distinguishing approved content items 610, from pending content items. In the example of FIG. 6A, approved content items are colored a shade of green, have a label marking them as approved, and are included in approved section 608.

Score 612 may be displayed to the user the score that was calculated for the content item (approved content items 610 or pending content items 616) at 320 or recalculated at 350.

Pending section 614 may contain pending content items 616 that have been created, but have not been approved for publishing. Pending content items 616 may be content items that have not been approved. Pending content item 616 may be distinguished from approved content items 610 by, for example, being a different color, being a different shape, having a different label, simply being included in pending section 614, or any other suitable manner of distinguishing pending content items 616, from approved content items 610. In the example of FIG. 6A, pending content items 616 are colored a shade of gray, have a label marking them as pending, and are included in pending section 614.

Edit text box 618 may allow a user to manually edit a content item that already exists as either an approved content item 610, or a pending content item 616. For example, the user may be provided with a content item that includes a title or heading, a text snippet that describes the content within the content item, etc. The accompanying text or text snippet that has been automatically generated can be edited by the user (e.g., to add a personal reflection of the content, to add a comment relating to the content, etc.). Edit text box 618 may include save and cancel options that may allow the user to save the newly edited form of the content item, or cancel the edit and revert to the unedited form of the content item.

Publish buttons 620 may allow the user to manually publish a content item to a selected account. For example, publish buttons 620 may be present in association with all content items, with free text box 604, with edit text box 618, and/or with any content item that the user has focused on, by for example, hovering over the location of the content item with a pointing device. In some embodiments, publish buttons 620 may be shown for any accounts linked to the profile. In some embodiments, publish buttons may be shown, but grayed-out for account types that are not linked to the profile. Selecting a publish button 620 associated with a content item may cause that content item to be published to the account associated with the selected publish button 620.

Time stamp 622 may display the time that the content item was created by the user, or if the content item was automatically created or recommended, the time when the content was originally published. Each content item may have a time stamp 622 associated with it.

Source identification 624 may display the source that was used to generate a content item, or the immediate source of the content item. For example, if a content item was automatically generated from a feed in feeds 534, source identification 624 may identify the name or title of the feed that was the source of the content item. As another example, if a content item was approved by a master profile, source identification may identify the name of the master profile that approved the content item. As another example, if a content item was created using free text box 604, source identification 624 may identify that the free text box 604 was used, for example, by identifying the username of the user that created the content item, or by identifying the dashboard as the source of the content item. As another example, if a "retweet" is used as the source of a content item, source identification 624 may identify "social media" as the source of the content item, or may identify the username attached to the account that was the source of the content item.

Checkbox 626 may allow a user to turn the auto-publish feature on and off without the need to access settings interface 500.

Figure 6B:
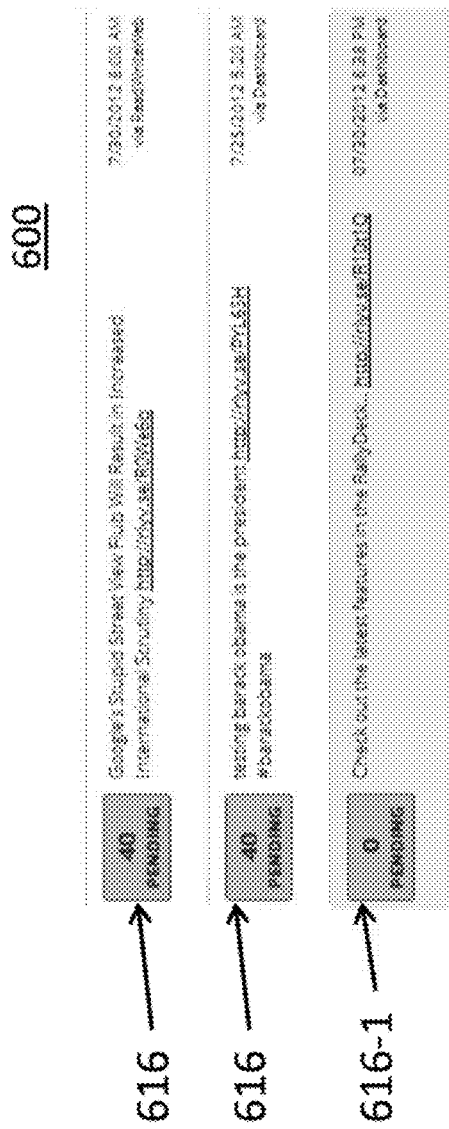

FIG. 6B shows an example of interface 600 after saving a content item created using free text box 604 in accordance with some embodiments. In the example of FIG. 6B, a pending content item 616-1 is shown after saving from free text box 604 shown in FIG. 6A. In some embodiments, 616-1 may be filled with a color for a specified period of time after saving to make it easier for the user to locate the newly created message among other pending content items 616. An example of the default destination entered in field 526, pending content item 616-1 contains a link that was not present when the content item 616-1 was saved in the free text box.

Figure 6C:
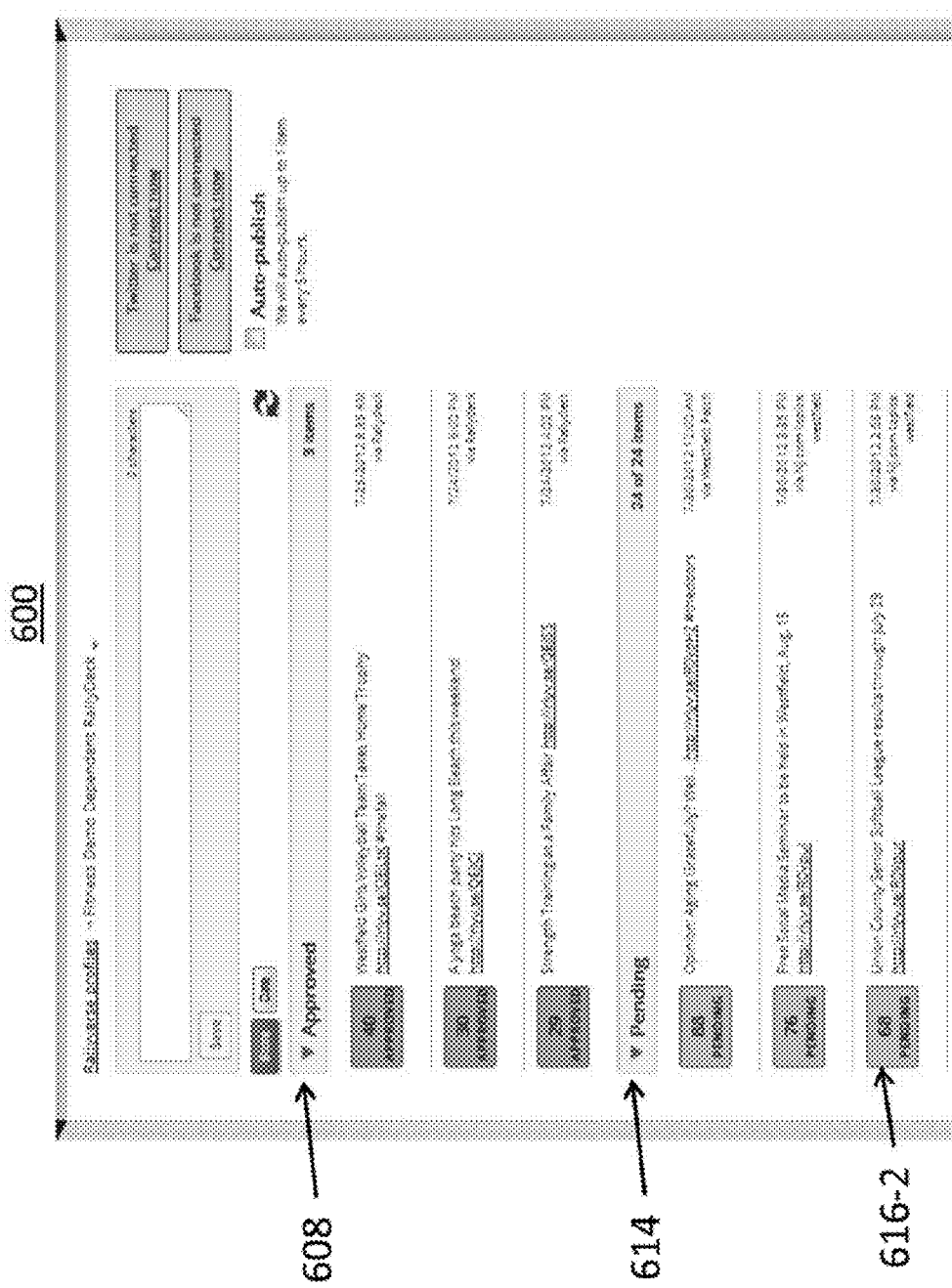
Figure 6D:
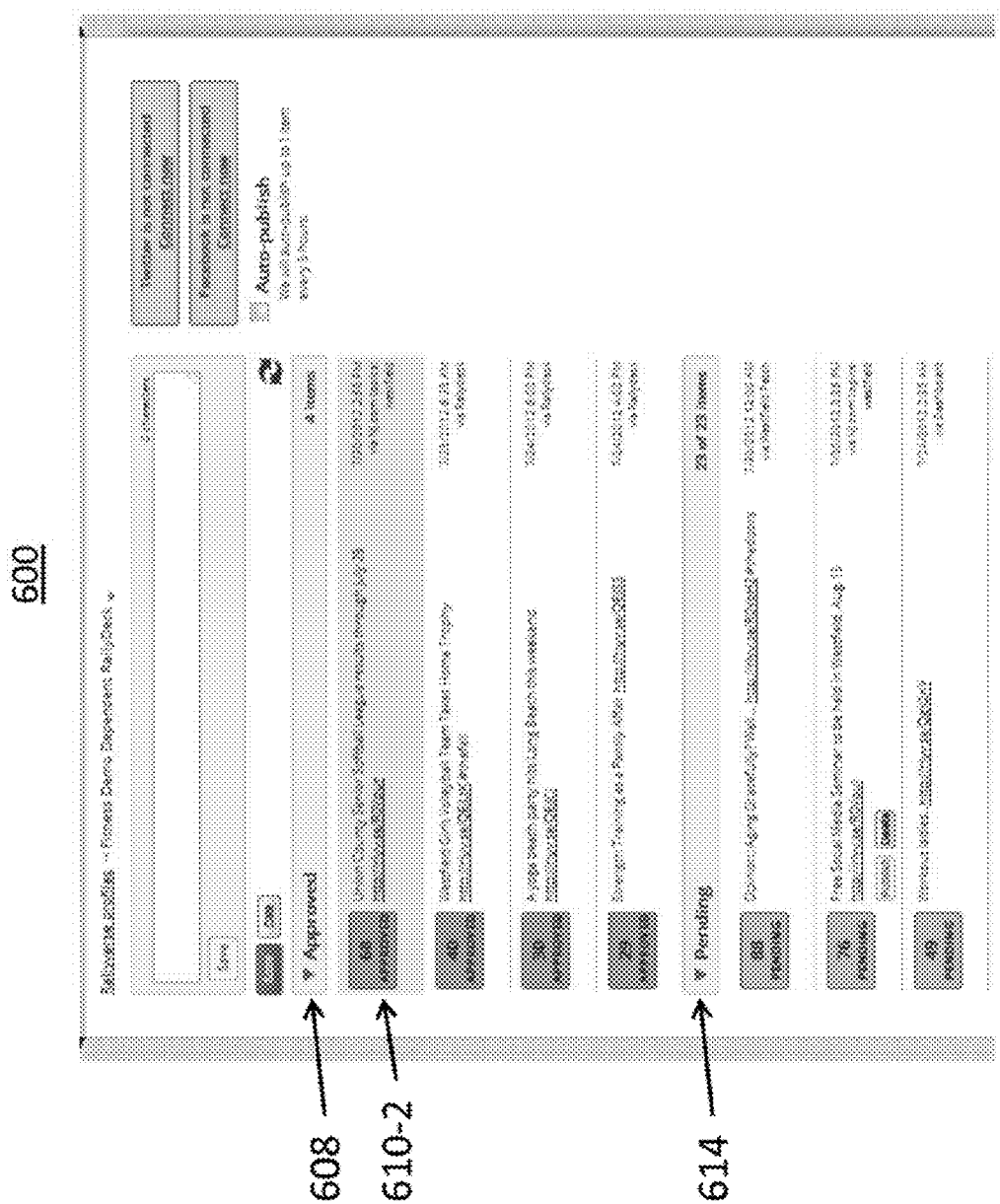

Turning to FIGS. 6C and 6D, an illustrative example of a user approving a pending content item 616-2 is shown in accordance with some embodiments. In some embodiments, a user may select pending content item 616-2, shown in FIG. 6C, for approval in various ways, which may include, selecting anywhere in the box containing the score for the content item, selecting "approved" from a dropdown, selecting an "approved" radio button, etc. After a user selects pending content item 616-2 for approval, it may become approved content item 610-2 in approved section as shown in the example of FIG. 6D. In some embodiments, the reverse process may also be performed to move an approved content item 610, to pending section 614. In either case, in some embodiments, a newly moved content item, such as 610-2, may be filled with a color for a specified period of time after moving to make it easier for the user to locate the newly created message among other content items. In some embodiments, the specified period of time may be set at a default value, such as two second, five second, etc., or may be set by the user in settings interface 500.

Figure 7A:
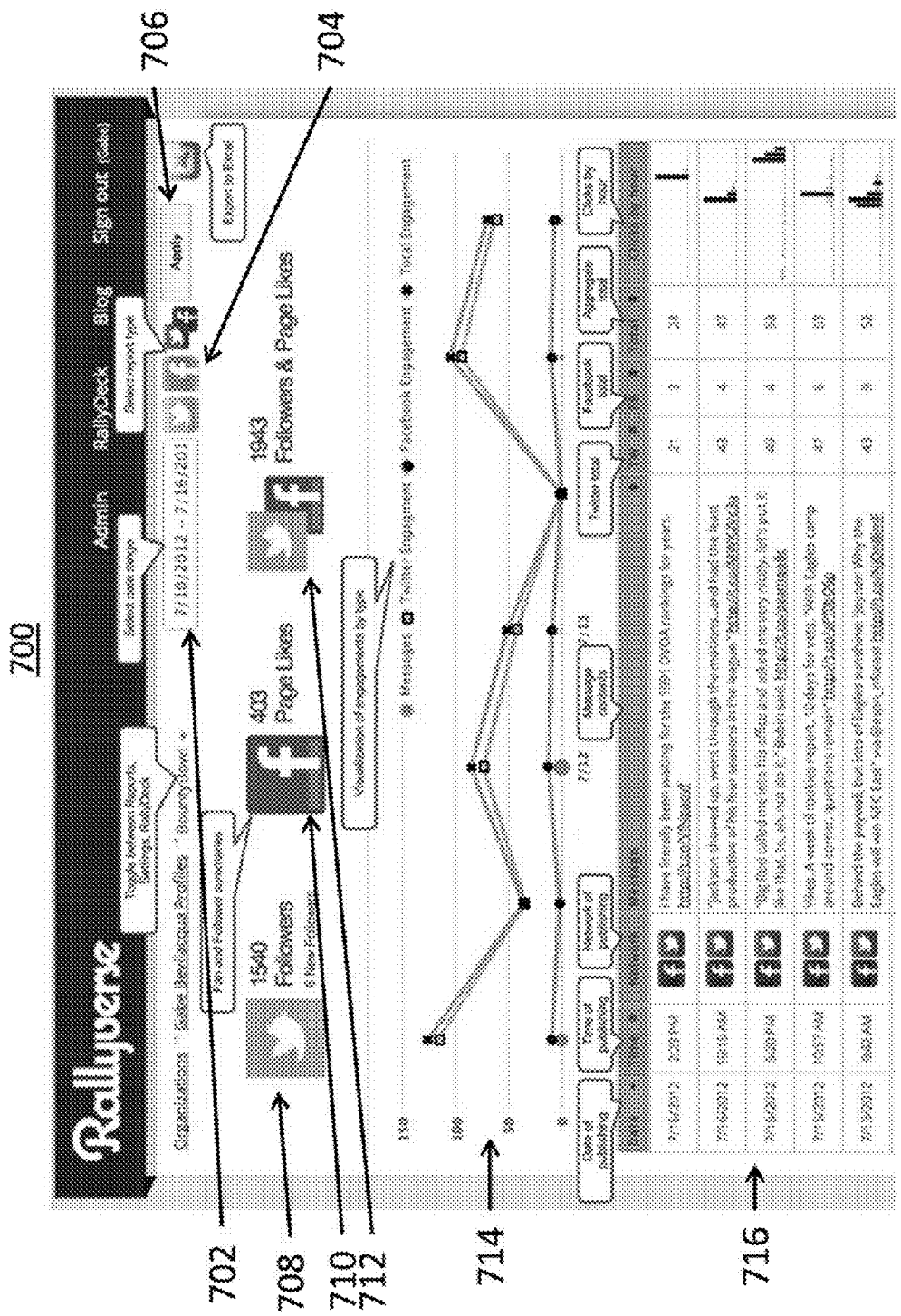
FIGS. 7A-7C are illustrative display screens that include interfaces for displaying reports relating to published content items in accordance with some embodiments of the disclosed subject matter.
Figure 7B:
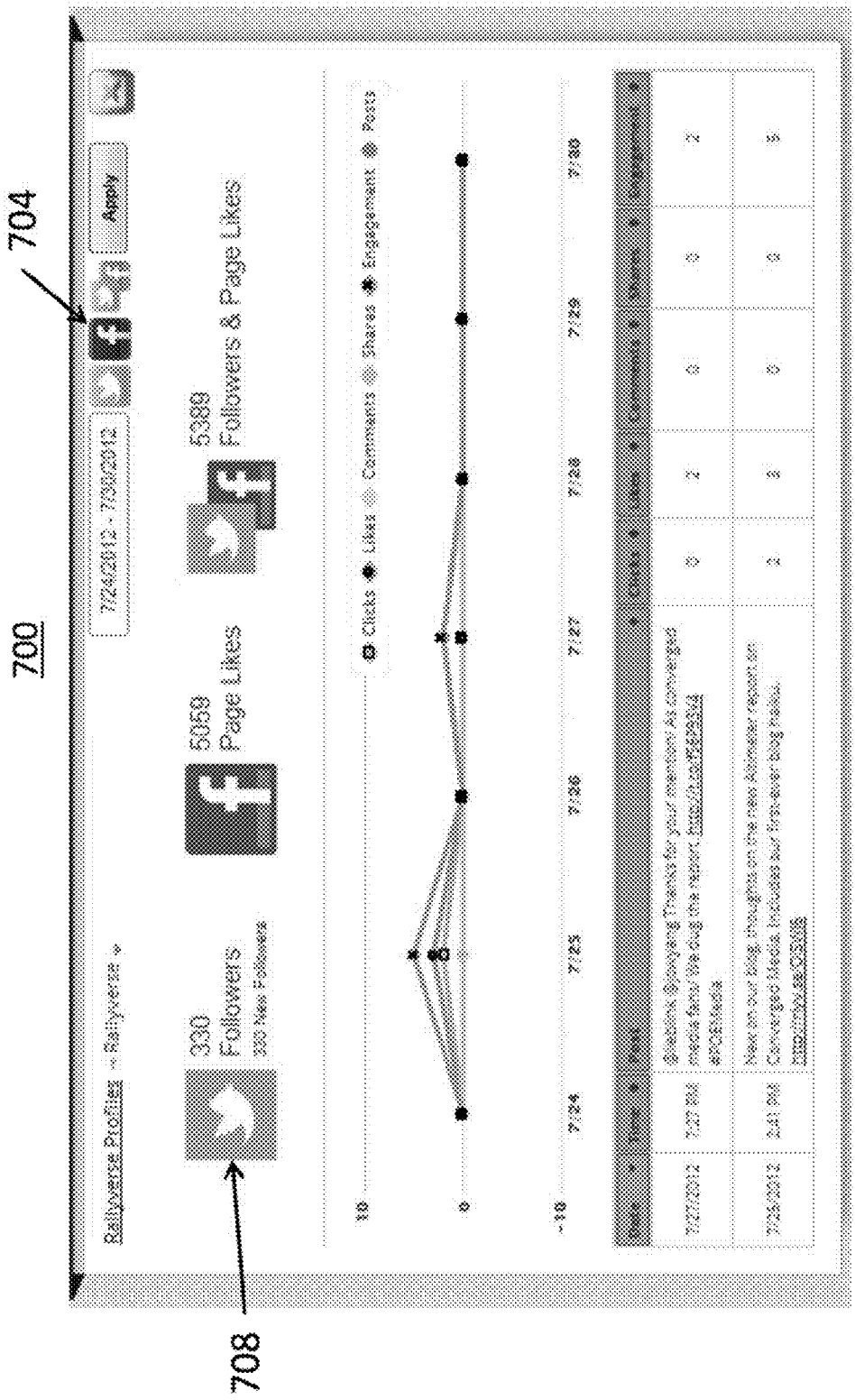
Figure 7C:
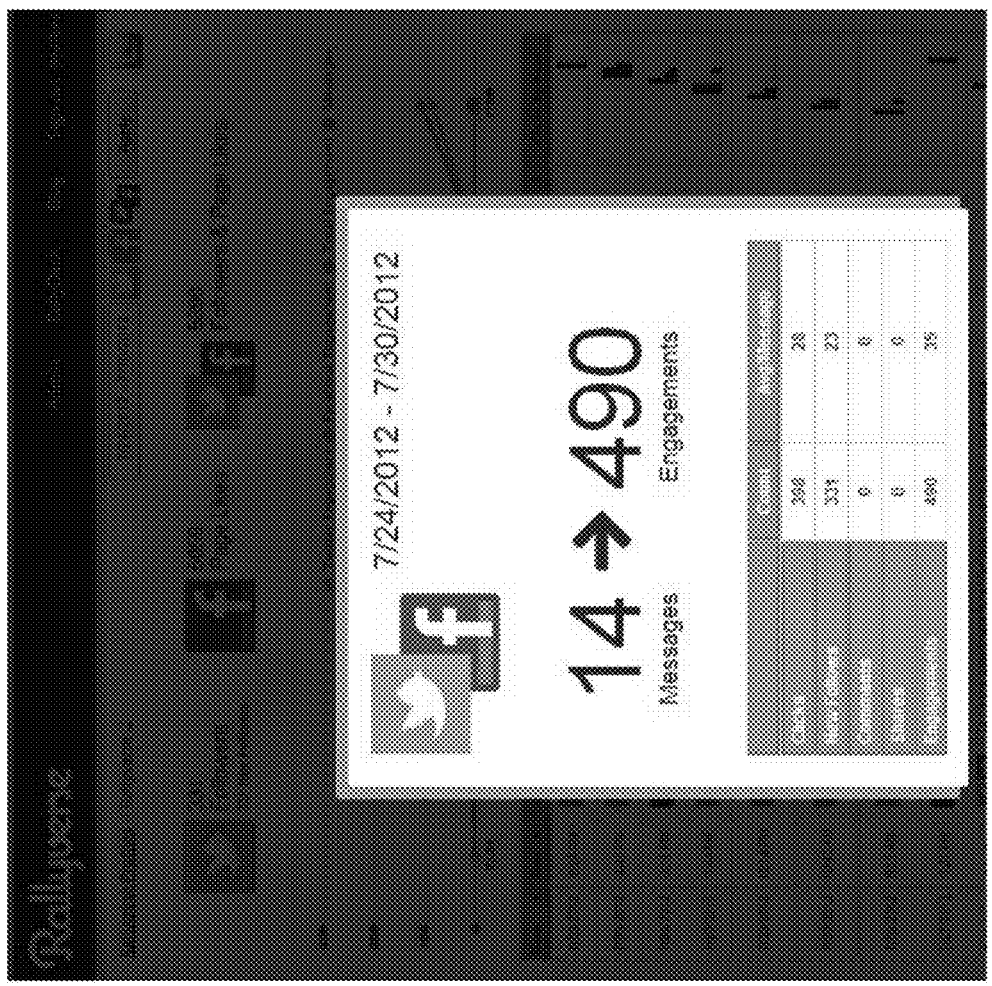

FIGS. 7A to 7C show examples of an interface 700 for displaying reports that may be generated, in some embodiments, to display to a user the amount of engagement there has been with published content items. FIG. 7A shows an example of interface 700 displaying a report generated for activity over the dates Jul. 10, 2012 to Jul. 16, 2012 in accordance with some embodiments. In some embodiments, interface 700 may include a field 702 for selecting a date range, account buttons 704 for selecting which accounts to generate the report for, an apply button 706 for applying changes made to the date range in field 702 or selection of account buttons 704, and summary buttons 708, 710 and 712 for selecting a textual summary for the activity on the accounts associated with summary buttons 708, 710 and 712. In some embodiments, interface 700 may further include a graphic area 714 for displaying a graphical summary of activity over the time period specified in field 702, and a detail area 716 for displaying each content item published over the period specified in field 702, along with details about the engagement with that content item on various accounts linked to the profile.

An example of a graphical summary is shown in graphical area 714 of FIG. 7A in accordance with some embodiments. Engagement generated for each account may be represented by a separate line in graphical area 714, where engagement is a measure of how much activity a given content item generated in relation to each account. For example, regarding TWITTER engagement, a click on a link, a retweet, and a new follower may each count as one engagement, where engagements may include anything that may measure engagement of a user-base with the content item. For example, impressions (or views), to the extent that they may be measured may be included as engagement, where an impression may count the same or less than another type of engagement. Taking FACEBOOK as an example, "likes" of a content message, new fans, "likes" of a page, views or impressions of a page, etc., may count as engagements.

In some embodiments, a user may choose which networks to view a report for by selecting a network, or networks with account buttons 704. For each network selected, a separate graphic element will be shown in graphical area 714 showing engagement over time. In some embodiments total engagement may be shown with a separate graphic element, where total engagement is the sum of engagement for each individual account at each measured moment in time (e.g., engagement may be plotted separately for each day).

In some embodiments the number of content items published is displayed by showing an object, where the size of the object any proportional to the number of content items published. In some embodiments, the size of the object may be linearly related to the number of content items published. In some embodiments, the size of the object may be proportional in some other way such that very large numbers of content items being published does not make the object dominate the graphical area. In the example shown in FIG. 7A, the object is a portion of a circle, but any object could be used, for example a silhouette of a bird, a letter, etc.

Detail area 716 may display information related to each content item that was published over the time period specified in field 702. In some embodiments, this information may include the date and time of publication, the accounts that the information was published to, the content item as published, engagement totals for each account type, total engagement across all accounts where the content item was posted, clicks on a link in the content item over time, or any combination of these.

FIG. 7B shows an example of a report displayed in interface 700 in accordance with some embodiments, where the user has specified one account (FACEBOOK) using account buttons 704. The report shown in the example of FIG. 7B is similar to the report shown in the example shown in FIG. 7A, except the information shown in graphical area 714 and detail area 716 is specific to the type of account chosen. In this case, engagement on FACEBOOK is broken down into more detail with total engagement being equal to the number of clicks, number of likes, number of comments, and number of shares.

Selecting any of summary buttons 708, 710 and 712 may cause a textual summary of the data to be displayed for the corresponding accounts over the time period specified in field 702. An example of a textual summary displayed in response to selection of summary button 708 is shown in FIG. 7C. In some embodiments, the textual summary may be displayed overlaid on interface 700. In some embodiments, the textual summary may be displayed on a separate area, or in a new page or screen.

In some embodiments, reports on engagement may be generated based on information available from the services associated with various accounts on which content items are published. In some embodiments, additional information may be gathered by shortening any URLs in a content item to a shortened URL that directs to a service provider domain, where it is then redirected to the final destination of the link. This may allow the service provider to track how many times the shortened URL was clicked by measuring the number of times an incoming request from a shortened URL was rerouted to the final destination. In some embodiments the total number of clicks is measured, whereas in some embodiments, the number of unique Internet Protocol addresses (IP addresses) that requested the final destination from the service provider's domain are tracked. Any other suitable form of click tracking may be used.

In some embodiments, engagement may be tracked by attaching a unique identifier to content items. This may allow a service provider that causes the unique identifier to be attached to content items to track the dissemination of the content items and further refine the recommendations based on who is further disseminating the content items with the attached unique identifiers.

In some embodiments, content items may be advertisements created in at least one of the following ways: created by the user; automatically generated from content sources such as feeds 534 or from content published by others; created by advertisers; or any other suitable manner of generating advertisements. In the case of automatically generating advertisements, in some embodiments, this may be done by a process similar to the process for automatically generating content items described above in connection with the example of FIG. 3, where advertisements may be specifically targeted at specific groups and may purposely include the name of the user's organization.

It should be noted that, although the embodiments described herein generally relate to generating, prioritizing, scoring, and/or publishing content items, this is merely illustrative. Similarly to the case of content items, advertisements may be scored based on the likelihood of engagement with the advertisement and/or relevance. These scores may be combined with other recommendations based on a target audience of the user. In some embodiments, content items that were originally created for another purpose may be recommended to be converted into advertisements based on the content item having a very high score, and thereby a high likelihood of engagement. In some embodiments, the information gathered about engagement of non-advertisement content items may be used to refine the scores for advertising content items. In some embodiments, information reported by an advertisement provider about past advertisements may be used to refine the scores for advertising content items and give a more accurate prediction of the likelihood of engagement for any given advertising content item. In some embodiments, the information on engagement may be used to enhance the placement of advertising content items based on the content of the advertising content item, the target audience, time of day or part of day, price or bid amount, etc.

In some embodiments, advertisements may be tailored to the specific platform where the advertisement is intended to be displayed. For example, advertisements being displayed on FACEBOOK may have different size limitations and other advertisement characteristics than advertisements appearing on TWITTER, LINKEDIN, or GOOGLE. Likewise, the use of images may be limited to various degrees on different advertisement platforms. In some embodiments, various versions of an advertisement may be created either automatically or manually based on the limitations of various advertising platforms. In some embodiments, a user using a profile to place advertisements may link the profile to various advertising accounts with various advertising providers.

In some embodiments, engagement information related to non-advertisement content items, advertising content items, and other content items related to the may be combined to give an overall impression of the effectiveness of an advertising and/or outreach campaign. Such a report may be similar to the engagement reports described in connection with FIGS. 7A to 7C, but inclusive of more information regarding advertising and forms of earned media.

Accordingly, methods, systems, and media for generating and prioritizing relevant content in real-time data systems are provided.

Although the invention has been described and illustrated in the foregoing illustrative embodiments, it is understood that the present disclosure has been made only by way of example, and that numerous changes in the details of implementation of the invention may be made without departing from the spirit and scope of the invention, which is limited only by the claims that follow. Features of the disclosed embodiments may be combined and rearranged in various ways.

It will also be understood that the detailed description herein may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The mechanism described herein also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the disclosure herein, or it may prove more convenient to construct more specialized apparatus to perform the required method steps. The required structure for a variety of these machines will appear from the description given.

What is claimed is:

1. A method for recommending content for publishing, the method comprising:
   receiving, using a hardware processor, information identifying a plurality of content sources associated with a user account;
   receiving, using the hardware processor, content from the plurality of content sources;
   determining, using the hardware processor, one or more term entities associated with the content;
   calculating, using the hardware processor, a term entity score for each of the one or more term entities based on a recency and a density at which the one or more term entities appear in one or more real-time information sources;
   calculating, using the hardware processor, a content item score for each of a plurality of content items by aggregating calculations, for each term entity, based on the term entity's respective term entity score and a frequency at which the term entity appears in the content item for which the content item score is calculated, wherein each of the plurality of content items comprises at least a portion of the content; and
   recommending, using the hardware processor, a content item of the plurality of content items for publication to at least one of the one or more real-time information sources based on the content item scores for the plurality of content items.

2. The method of claim 1, wherein calculating the term entity score for each of the one or more term entities further comprises calculating the recency for each of the one or more term entities contained in the content, wherein the recency is based on the number of times, N, each of the one or more term entities appears in the one or more real-time information sources over a predetermined period of time.

3. The method of claim 2, wherein calculating the term entity score for each of the one or more term entities further comprises calculating the density for each of the one or more term entities contained in the content, wherein the density is based on the standard deviation of the time between appearances of each of the one or more term entities in the one or more real-time information sources during a predetermined period of time.

4. The method of claim 1, further comprising:
automatically generating, using the hardware processor, the recommended content item based on at least a portion of content from at least one of the one or more real-time information sources, wherein the automatically generated content item is automatically formatted for publication to at least one of the one or more real-time information sources.

5. The method of claim 4, wherein the automatically generated content item comprises a text portion describing the content item and wherein the method further comprises:
receiving, using the hardware processor, an updated text portion that replaces the text portion;
calculating, using the hardware processor, an updated content item score for the content item that includes the updated text portion; and
ranking, using the hardware processor, the content item based on the updated content item score.

6. The method of claim 1, further comprising:
receiving, using the hardware processor, a plurality of topics associated with a profile;
calculating, using the hardware processor, a relevance score based on similarity between a first vector of keywords representing each topic and a second vector of keywords representing the term entities associated with the recommended content item;
generating, using the hardware processor, an updated content item score based on the relevance score and the content item score; and
adjusting, using the hardware processor, the content item score based on the updated content item score.

7. The method of claim 1, further comprising:
automatically publishing to at least one of the one or more real-time information sources, using the hardware processor, the content item recommended for publication based on the content item score of the recommended content item.

8. The method of claim 7, further comprising:
receiving, using the hardware processor, a maximum automatic publication frequency, wherein automatically publishing is inhibited if the maximum automatic publication frequency is met or exceeded.

9. The method of claim 1, further comprising:
receiving, using the hardware processor, an instruction from a user to designate the recommended content item as approved for publication; and
designating, using the hardware processor, the content item as an approved content item.

10. The method of claim 9, further comprising:
creating, using the hardware processor, a child profile, wherein the child profile is associated with at least one parent profile;
automatically populating, using the hardware processor, the child profile with content items in the parent profile that are designated as approved content items; and
automatically designating, using the hardware processor, the automatically populated content items as approved content items in the child profile.

11. A method for recommending content for publishing, the method comprising:
receiving, using a hardware processor, content from one or more content sources;
determining, using the hardware processor, a plurality of interests associated with a publishing entity;
retrieving, using the hardware processor, a plurality of candidate content owned by the publishing entity, wherein the plurality of candidate content includes published candidate content and unpublished candidate content;
determining, using the hardware processor, one or more term entities associated with either the received content or the candidate content;
calculating, using the hardware processor, a term entity score for each of the one or more term entities based on a recency and a density at which the one or more term entities appear in one or more real-time information sources;
calculating, using the hardware processor, a content item score for each of a plurality of content items by aggregating calculations, for each term entity, based on the term entity's respective term entity score and a frequency at which the term entity appears in the content item for which the content item score is calculated, wherein each of the plurality of content items comprises at least a portion of the received content or the candidate content;
ranking, using the hardware processor, the plurality of candidate content owned by the publishing entity and the received content based on their respective content item scores and the determined plurality of interests; and
recommending, using the hardware processor, a content item for publication to at least one of the one or more real-time information sources based on the ranking, wherein the content item comprises at least a portion of the received content or the candidate content.

12. A system for recommending content for publishing, the system comprising:
a processor that is configured to:
receive information identifying a plurality of content sources associated with a user account;
receive content from the plurality of content sources;
determine one or more term entities associated with the content;
calculate a term entity score for each of the one or more term entities based on a recency and a density at which the one or more term entities appear in one or more real-time information sources; and
calculate a content item score for each of a plurality of content items by aggregating calculations, for each term entity, based on the term entity's respective term entity score and a frequency at which the term entity appears in the content item for which the content item score is calculated, wherein each of the plurality of content items comprises at least a portion of the content;
recommend a content item of the plurality of content items for publication to at least one of the one or more real-time information sources based on the content item scores for the plurality of content items.

13. The system of claim 12, wherein the processor is further configured to calculate the recency for each of the one or more term entities contained in the content, wherein the recency is based on the number of times, N, each of the one or more term entities appears in the one or more real-time information sources over a predetermined period of time.

14. The system of claim 13, wherein the processor is further configured to calculating the density for each of the one or more term entities contained in the content, wherein the density is based on the standard deviation of the time between appearances of each of the one or more term entities in the one or more real-time information sources during a predetermined period of time.

15. The system of claim 12, wherein the processor is further configured to:
   automatically generate the recommended content item based on at least a portion of content from at least one of the one or more real-time information sources, wherein the automatically generated content item is automatically formatted for publication to at least one of the one or more real-time information sources.

16. The system of claim 12, wherein the automatically generated content item comprises a text portion describing the content item and wherein the processor is further configured to:
   receive an updated text portion that replaces the text portion;
   calculate an updated content item score for the content item that includes the updated text portion; and
   rank the content item based on the updated content item score.

17. The system of claim 12, wherein the processor is further configured to:
   receive a plurality of topics associated with a profile;
   calculate a relevance score based on similarity between a first vector of keywords representing each topic and a second vector of keywords representing the term entities associated with the recommended content item;
   generate an updated content item score based on the relevance score and the content item score; and
   adjust the content item score based on the updated content item score.

18. The system of claim 12, wherein the processor is further configured to:
   automatically publish to at least one of the one or more real-time information sources the content item recommended for publication based on the content item score of the recommended content item.

19. The system of claim 18, wherein the processor is further configured to:
   receive a maximum automatic publication frequency, wherein automatically publishing is inhibited if the maximum automatic publication frequency is met or exceeded.

20. The system of claim 12, wherein the processor is further configured to:
   receive an instruction from a user to designate the recommended content item as approved for publication; and
   designate the content item as an approved content item.

21. The system of claim 20, wherein the processor is further configured to:
   create a child profile, wherein the child profile is associated with at least one parent profile;
   automatically populate the child profile with content items in the parent profile that are designated as approved content items; and
   automatically designate the automatically populated content items as approved content items in the child profile.

22. A system for recommending content for publishing, the system comprising:
   a processor that is configured to:
      receive content from one or more content sources;
      determine a plurality of interests associated with a publishing entity;
      retrieve a plurality of candidate content owned by the publishing entity, wherein the plurality of candidate content includes published candidate content and unpublished candidate content;
      determine one or more term entities associated with either the received content or the candidate content;
      calculate a term entity score for each of the one or more term entities based on a recency and a density at which the one or more term entities appear in one or more real-time information sources;
      calculate a content item score for each of a plurality of content items by aggregating calculations, for each term entity, based on the term entity's respective term entity score and a frequency at which the term entity appears in the content item for which the content item score is calculated, wherein each of the plurality of content items comprises at least a portion of the received content or the candidate content;
      rank the plurality of candidate content owned by the publishing entity and the received content based on their respective content item scores and the determined plurality of interests; and
      recommend a content item for publication to at least one of the one or more real-time information sources based on the ranking, wherein the content item comprises at least a portion of the received content or the candidate content.

23. A non-transitory computer-readable medium containing computer-executable instructions that, when executed by a processor, cause the processor to perform a method for recommending content for publishing, the method comprising:
   receiving information identifying a plurality of content sources associated with a user account;
   receiving content from the plurality of content sources;
   determining one or more term entities associated with the content;
   calculating a term entity score for each of the one or more term entities based on a recency and a density at which the one or more term entities appear in one or more real-time information sources;
   calculating, using the hardware processor, a content item score for each of a plurality of content items by aggregating calculations, for each term entity, based on the term entity's respective term entity score and a frequency at which the term entity appears in the content item for which the content item score is calculated, wherein each of the plurality of content items comprises at least a portion of the content; and
   recommending a content item of the plurality of content items for publication to at least one of the one or more real-time information sources based on the content item scores for the plurality of content items.

24. A non-transitory computer-readable medium containing computer-executable instructions that, when executed by a processor, cause the processor to perform a method for recommending content for publishing, the method comprising:
   receiving content from one or more content sources;
   determining a plurality of interests associated with a publishing entity;
   retrieving a plurality of candidate content owned by the publishing entity, wherein the plurality of candidate content includes published candidate content and unpublished candidate content;
   determining one or more term entities associated with either the received content or the candidate content;
   calculating a term entity score for each of the one or more term entities based on a recency and a density at which the one or more term entities appear in one or more real-time information sources;

calculating a content item score for each of a plurality of content items by aggregating calculations, for each term entity, based on the term entity's respective term entity score and a frequency at which the term entity appears in the content item for which the content item score is calculated, wherein each of the plurality of content items comprises at least a portion of the received content or the candidate content;

ranking the plurality of candidate content owned by the publishing entity and the received content based on their respective content item scores and the determined plurality of interests; and recommending a content item for publication to at least one of the one or more real-time information sources based on the ranking, wherein the content item comprises at least a portion of the received content or the candidate content.

* * * * *